United States Patent
Ripp et al.

(10) Patent No.: US 9,308,422 B2
(45) Date of Patent: **\*Apr. 12, 2016**

(54) GOLF CLUB HEAD WITH TEXTURED STRIKING FACE

(71) Applicant: DUNLOP SPORTS CO. LTD., Kobe (JP)

(72) Inventors: Patrick Ripp, Seal Beach, CA (US); Roberto Aguayo, Downey, CA (US); Jeffrey D. Brunski, Los Angeles, CA (US); Matthew R. Daraskavich, Huntington Beach, CA (US); Sharon J. Park, Irvine, CA (US)

(73) Assignee: DUNLOP SPORTS CO. LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,896

(22) Filed: Sep. 10, 2014

(65) Prior Publication Data
US 2014/0378245 A1 Dec. 25, 2014

Related U.S. Application Data

(63) Continuation of application No. 14/174,671, filed on Feb. 6, 2014, now Pat. No. 8,858,361, which is a continuation-in-part of application No. 13/829,238, filed on Mar. 14, 2013, now Pat. No. 8,979,670.

(60) Provisional application No. 61/754,302, filed on Jan. 18, 2013.

(51) Int. Cl.
*A63B 53/08* (2015.01)
*A63B 53/04* (2015.01)
(Continued)

(52) U.S. Cl.
CPC .............. *A63B 53/047* (2013.01); *B21D 22/00* (2013.01); *B23C 3/13* (2013.01); *B23C 3/28* (2013.01); *B23C 3/34* (2013.01); *B23K 26/364* (2015.10);
(Continued)

(58) Field of Classification Search
CPC .................. A63B 53/08; A63B 53/04; A63B 2053/0445; A63B 2053/0416
USPC .......................................... 473/331, 330, 409
See application file for complete search history.

(56) References Cited

U.S. PATENT DOCUMENTS 1,289,553 A    12/1918  Sanders
1,965,954 A *  7/1934   Davis ............................ 473/242
(Continued)

OTHER PUBLICATIONS

Publication on Golf.com dated Nov. 10, 2011; http://www.golf.com/equipment/nike-yr-pro-forged-ds-wedge.
(Continued)

*Primary Examiner* — Benjamin Layno
(74) *Attorney, Agent, or Firm* — Oliff PLC

(57) ABSTRACT

A golf club head includes a heel portion, a toe portion, a hosel, and a striking face. The striking face includes a plurality of scorelines each having an average depth no less than about 0.10 mm, a plurality of first micro-grooves each having an average depth no greater than about 0.010 mm, and a plurality of second micro-grooves overlaid on the first micro-grooves, each of the second micro-grooves having an average depth greater than the average depth of the first micro-grooves. Some embodiments can also have a plurality of textured surface treatment regions superimposed on the overlaid first and second micro-grooves so as to at least partially intersect the micro-grooves.

20 Claims, 22 Drawing Sheets

(51) Int. Cl.
  *B23C 3/34*    (2006.01)
  *B21D 22/00*   (2006.01)
  *B23C 3/28*    (2006.01)
  *B23K 26/36*   (2014.01)
  *B23C 3/13*    (2006.01)

(52) U.S. Cl.
  CPC .............. *B23K 26/367* (2013.01); *A63B 53/04* (2013.01); *A63B 53/08* (2013.01); *A63B 2053/0408* (2013.01); *A63B 2053/0416* (2013.01); *A63B 2053/0445* (2013.01); *Y10T 29/49995* (2015.01); *Y10T 409/303752* (2015.01)

(56) References Cited

U.S. PATENT DOCUMENTS

| | | | |
|---|---|---|---|
| D257,736 S | 12/1980 | Lyon et al. | |
| 5,176,384 A | 1/1993 | Sata et al. | |
| 5,398,929 A | 3/1995 | Kitaichi | |
| 5,403,007 A | 4/1995 | Chen | |
| 5,447,311 A | 9/1995 | Viollaz et al. | |
| 5,472,201 A | 12/1995 | Aizawa et al. | |
| 5,643,103 A | 7/1997 | Aizawa | |
| D395,476 S | 6/1998 | Pond et al. | |
| D399,276 S | 10/1998 | Hettinger et al. | |
| D399,277 S | 10/1998 | Ezaki | |
| D399,549 S | 10/1998 | Hettinger et al. | |
| 5,967,903 A | 10/1999 | Cheng | |
| D420,079 S | 2/2000 | Frazetta | |
| D478,949 S | 8/2003 | DeLaCruz | |
| D570,934 S | 6/2008 | Ban et al. | |
| D588,222 S | 3/2009 | Takahashi | |
| D588,666 S | 3/2009 | Takahashi | |
| 7,594,863 B2 | 9/2009 | Ban | |
| D606,605 S | 12/2009 | Wada et al. | |
| D607,070 S | 12/2009 | Wada et al. | |
| D607,071 S | 12/2009 | Wada et al. | |
| 7,695,377 B2 | 4/2010 | Yamagishi et al. | |
| D617,406 S | 6/2010 | Carlyle et al. | |
| 7,918,747 B2 | 4/2011 | Johnson et al. | |
| D643,490 S | 8/2011 | Wada et al. | |
| 8,012,036 B2 * | 9/2011 | Nakamura | 473/290 |
| D658,248 S | 4/2012 | Nunez et al. | |
| 8,287,401 B2 * | 10/2012 | Tateno et al. | 473/331 |
| 8,684,861 B2 * | 4/2014 | Carlyle et al. | 473/331 |
| 8,858,361 B2 * | 10/2014 | Ripp et al. | 473/331 |
| 2008/0020859 A1 * | 1/2008 | Yamagishi et al. | 473/324 |
| 2008/0051212 A1 | 2/2008 | Voges | |
| 2008/0125241 A1 | 5/2008 | Tateno et al. | |
| 2008/0300068 A1 * | 12/2008 | Chao | 473/342 |
| 2011/0111883 A1 | 5/2011 | Cackett | |
| 2011/0165963 A1 | 7/2011 | Cackett et al. | |
| 2011/0256956 A1 | 10/2011 | Hocknell et al. | |
| 2011/0269567 A1 * | 11/2011 | Ban et al. | 473/331 |

OTHER PUBLICATIONS

Photograph of golf club described in Nov. 10, 2011 publication on Golf.com.

* cited by examiner

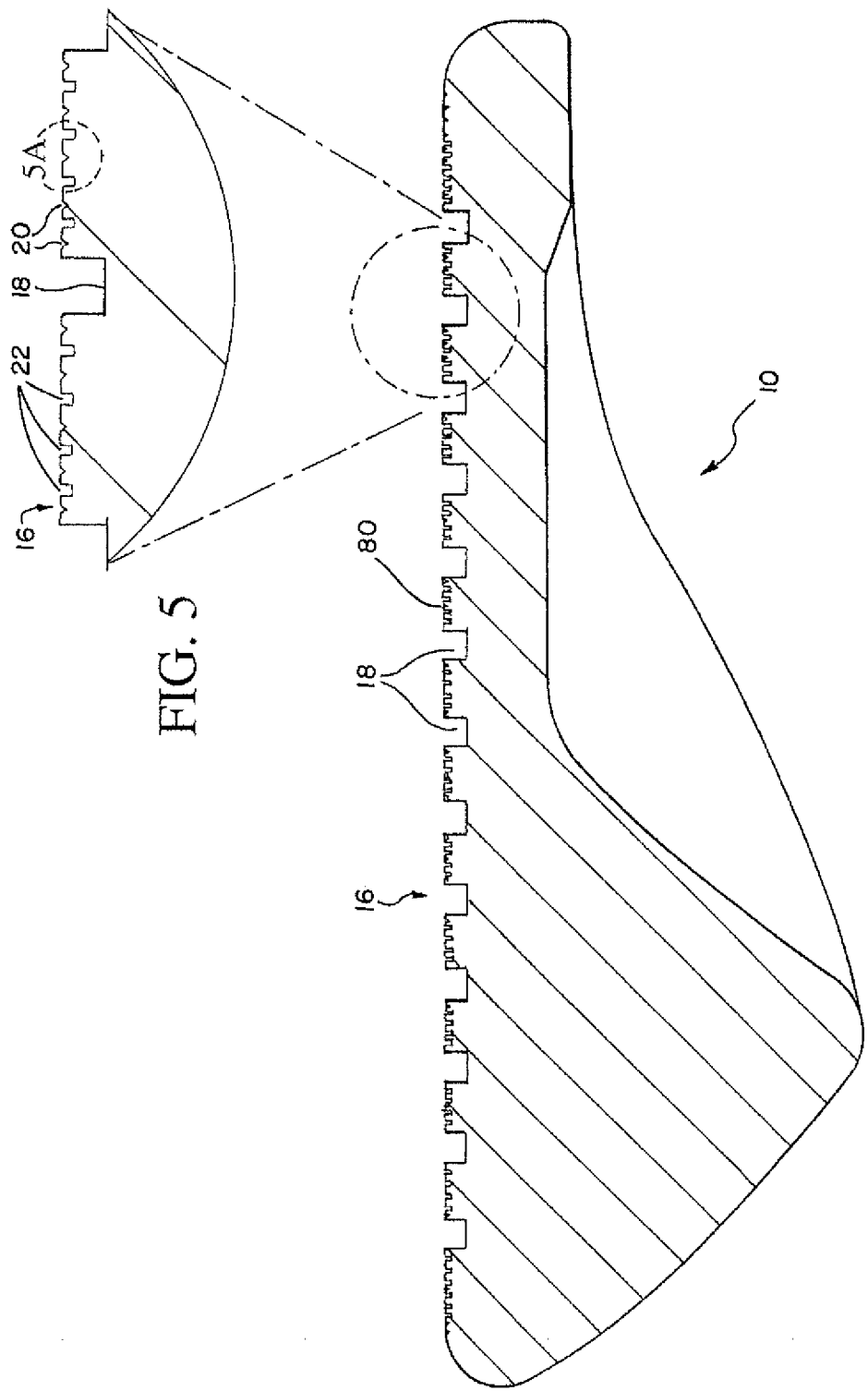

GOLF CLUB HEAD WITH TEXTURED STRIKING FACE

CROSS-REFERENCE TO RELATED APPLICATIONS

This application is a continuation application of U.S. patent application Ser. No. 14/174,671, filed Feb. 6, 2014, now U.S. Pat. No. 8,858,361, which is a continuation-in-part of U.S. patent application Ser. No. 13/829,238, filed on Mar. 14, 2013, now U.S. Pat. No. 8,979,670, which claims the benefit, under 35 U.S.C. §119(e), of U.S. provisional patent application Ser. No. 61/754,302, filed on Jan. 18, 2013. The subject matter of each of the priority applications is incorporated herein by reference in its entirety.

BACKGROUND

This disclosure relates generally to the field of golf clubs. More particularly, it relates to a golf club head with a textured striking face for imparting greater spin to a golf ball when the golf ball is struck.

A common goal of golf club head design, specifically for iron-type and utility-type club heads, and particularly for wedges, is to create a striking face for the club head that imparts significant spin to a struck ball. The striking face of such a club head typically has a plurality of parallel horizontal grooves or score lines. These score lines assist in imparting spin at least by channeling water and debris, and by increasing the friction between the striking face and the surface of the ball. The spin-imparting qualities provided by such score lines are limited, however, by United States Golf Association ("USGA" herein) regulations governing score line geometry (and similar regulations of other international golf equipment regulatory bodies). Moreover, conventional score lines fail to account for low-scale dynamic interactions between the striking face and the ball.

Further improvements in the spin-imparting characteristics of club head striking faces have included the provision of low-scale surface textures in addition to, or in place of, the conventional score lines. Such surface textures, however, tend not to take into account the specific interaction between a conventional elastomer-covered golf ball and a metallic striking face. Moreover, conventional surface texturing is subject to rapid wear, is often costly to produce, and may detract from the aesthetic quality of the club head. Furthermore, conventional striking face textures are generally ineffective at providing a high degree of spin for each of the multitude of different types of golf shots that a golfer may attempt. For example, a ball hit with a club having a conventional club head that is swung at a specific speed would have different degrees of spin depending on whether the ball is squarely addressed by the club face or hit with an open club face. Other conditions, such as moisture on the club face and/or the ball, and whether the ball is struck with a full swing, half swing, or chip-type swing of the club, can affect the degree of spin imparted to the ball.

The creation of spin, particularly back-spin, on a struck golf ball, is largely a function of the magnitude of the frictional contact or "traction" between the striking face of the club head and the ball on impact. Where a high degree of back-spin is desired, as in higher number irons and wedges, maximizing this traction factor is therefore a design goal. Increased traction is generally associated with increased surface roughness of the striking face. Surface roughness is commonly expressed in terms of $R_a$, defined as follows:

$$R_a = \frac{1}{n}\sum_{i=1}^{n}|y_i|$$

where n is the number of sampling points and y is the deviation from a mean line (at a given sampling point). As a practical matter, $R_a$ represents the average of deviations from a mean line over a 2-dimensional sample length of a surface.

Another surface roughness parameter is known as $R_t$ (sometimes referred to as $R_y$). This parameter represents the maximum peak-to-trough distance in a given 2-dimensional sample length of a surface.

The regulations of the USGA limit the surface roughness of the striking face of golf clubs generally to a degree of roughness no greater than that imparted by sand-blasting or fine milling. In practical terms, this standard has been interpreted to mean a surface having a value of $R_a$ no greater than 0.0046 mm (180 μin.), and a value of $R_t$ of no more than 0.025 mm (1000 μin.). Thus, the need is evident to maximize the traction between the club face and the struck ball without exceeding the roughness maximum established by USGA rules.

Accordingly, a textured striking face for a golf club head has been sought that imparts a high degree of spin to the ball for a wide variety of golf shots under a wide variety of conditions, that has good wear characteristics, that complies with USGA rules, and that enhances (or at least does not detract from) the aesthetic qualities of the club head.

SUMMARY

In accordance with one embodiment, a golf club head is provided having a heel portion, a toe portion opposite the heel portion, a hosel adapted to receive a shaft, a striking face, and a rear surface opposite the striking face. The striking face can include a plurality of score lines that have an average depth no less than about 0.10 mm. The striking face can also have a first micro-groove pattern and a second micro-groove pattern overlaid on the first micro-groove pattern. The first micro-groove pattern has a plurality of arcuate first micro-grooves that are parallel to one another, each of the first micro-grooves having a first average depth no greater than about 0.025 mm and a first average width no greater than about 0.51 mm. The second micro-groove pattern has a plurality of second micro-grooves that are parallel to one another, each of the second micro-grooves having a second average depth no greater than about 0.025 mm and a second average width different than the first average width.

In some such embodiments the second average depth is greater than the first average depth, and in some embodiments is a whole number multiple of the first average width.

In other embodiments the second arcuate micro-grooves are substantially parallel to the first arcuate micro-grooves.

Other embodiments can additionally comprise a third micro-groove pattern comprising a plurality of arcuate third micro-grooves that are parallel to one another. Each of the third micro-grooves can have a third average depth no less than the second average depth and a third average width no less than the second average width.

In some such embodiments the third micro-grooves are not parallel to at least one of the first and second micro-grooves.

In further embodiments the striking face additionally comprises a plurality of surface treatment regions overlaid onto the first and second micro-groove patterns. The plurality of surface treatment regions can comprise heat-treated regions. The plurality of surface treatment regions can also or instead comprise laser etched regions. In some embodiments, each of the surface treatment regions extends along a generally linear path.

Another embodiment provides a golf club head comprising a heel portion, a toe portion opposite the heel portion, a hosel adapted to receive a shaft, a striking face, and a rear surface opposite the striking face. The striking face can include a plurality of score lines each having an average depth no less than about 0.10 mm, a first micro-groove pattern and a second micro-groove pattern overlaid on the first micro-groove pattern. The first micro-groove pattern comprises a plurality of parallel arcuate first micro-grooves, each of the first micro-grooves having a first cross-sectional profile that defines a first average depth no greater than about 0.025 mm and a first average width no greater than about 0.51 mm, and following a first arcuate path that curves about a first center of curvature. The second micro-groove pattern comprises a plurality of parallel arcuate second micro-grooves, each of the second micro-grooves having a second cross-sectional profile that defines a second average depth no greater than about 0.025 mm and a second average width no greater than about 0.51 mm, and following a second arcuate path that curves about a second center of curvature. One or more of the second average depth, second average width and second center of curvature are different than respective ones of the first average depth, first average width and first center of curvature.

In some such embodiments the golf club head has a virtual ground plane when the golf club head is in a reference position, and the first center of curvature is below the virtual ground plane. In additional embodiments the second center of curvature is also below the virtual ground plane. But in further embodiments the second center of curvature is above the virtual ground plane.

In further embodiments aligned first ends of the score lines, proximate the heel, define a first virtual vertical plane and aligned second ends of the score lines, proximate the toe, define a second virtual vertical plane, and the first center of curvature is between the first and second virtual vertical planes. In some such embodiments the second center of curvature is above the virtual ground plane and between the first and second virtual vertical planes.

In yet additional embodiments the second center of curvature is offset 180° from the first center of curvature. But in some additional embodiments the second center of curvature is aligned with the first center of curvature.

Yet further embodiments can additionally comprise a third micro-groove pattern overlaid onto the first and second micro-groove patterns, the third micro-groove pattern comprising a plurality of third micro-grooves, each of the third micro-grooves having a third average depth no greater than about 0.025 mm, a third average width no greater than about 0.51 mm, and following a third arcuate path that curves about a third center of curvature, the third arcuate grooves being parallel to one another. One or more of the third average depth, third average width and third center of curvature is different than respective ones of the second average depth, second average width and second center of curvature.

In some such embodiments the third center of curvature is above the virtual ground plane, and the third micro-grooves are not parallel to the first or second micro-grooves.

In yet further embodiments a method of making a golf club head is provided, comprising providing a club head main body including a striking face; and forming a first textured surface pattern in the striking face, the first textured surface pattern imparting a surface roughness value to the striking face. Forming the first texture surface pattern comprises forming a first micro-groove pattern and forming a second micro-groove pattern superimposed on the first micro-groove pattern. Forming the first micro-groove pattern comprises forming a plurality of arcuate first micro-grooves that are parallel to one another, each of the first micro-grooves having a first average depth, a first average width, and following a first arcuate path that curves about a first center of curvature. Forming the second micro-groove pattern comprises forming a plurality of arcuate second micro-grooves that are parallel to one another, each of the second micro-grooves having a second average depth, a second average width, and following a second arcuate path that curves about a second center of curvature. One or more of the second average depth, second average width and second center of curvature are different than respective ones of the first average depth, first average width and first center of curvature.

In some embodiments forming the first micro-groove pattern comprises mechanically milling the first micro-grooves at a first milling depth, and milling at a first feed rate.

In further embodiments, forming the second micro-groove pattern comprises mechanically milling the second micro-grooves at a second milling depth, and milling at a second feed rate, wherein the second milling depth is deeper than the first milling depth and the second feed rate is greater than the first feed rate. In other embodiments, forming the second micro-groove pattern comprises mechanically milling the second micro-grooves at a second milling depth, and milling at a second feed rate, wherein the second milling depth is deeper than the first milling depth and the second feed rate is greater than the first feed rate.

Other embodiments additionally comprise forming a third micro-groove pattern comprising a plurality of arcuate third micro-grooves that are parallel to one another, each of the third micro-grooves having a third average depth, a third average width, and following a third arcuate path that curves about a third center of curvature, the third micro-groove pattern being superimposed on the first and second micro-groove patterns, wherein the third center of curvature is different than the second center of curvature so that the third micro-grooves cross the second micro-grooves.

In some embodiments, forming the third micro-groove pattern comprises mechanically milling the third micro-grooves at the second milling depth.

Some embodiments additionally comprise forming a second textured surface pattern superimposed on the first textured surface pattern in the striking face so as to increase the surface roughness value of the striking face. In some embodiments, forming the second textured surface pattern includes laser etching the second textured surface pattern.

BRIEF DESCRIPTION OF THE DRAWINGS

FIG. 4 is a cross-sectional view taken along plane 4-4 of FIG. 2;

FIG. 5 is detail view of a portion of the cross-sectional view of FIG. 4;

DETAILED DESCRIPTION

The drawings and their descriptions may indicate sizes, shapes and configurations of the various components. Such depictions and descriptions should not be interpreted as limiting. Alternative sizes, shapes and configurations are also contemplated as within the scope of this disclosure.

Figure 1:
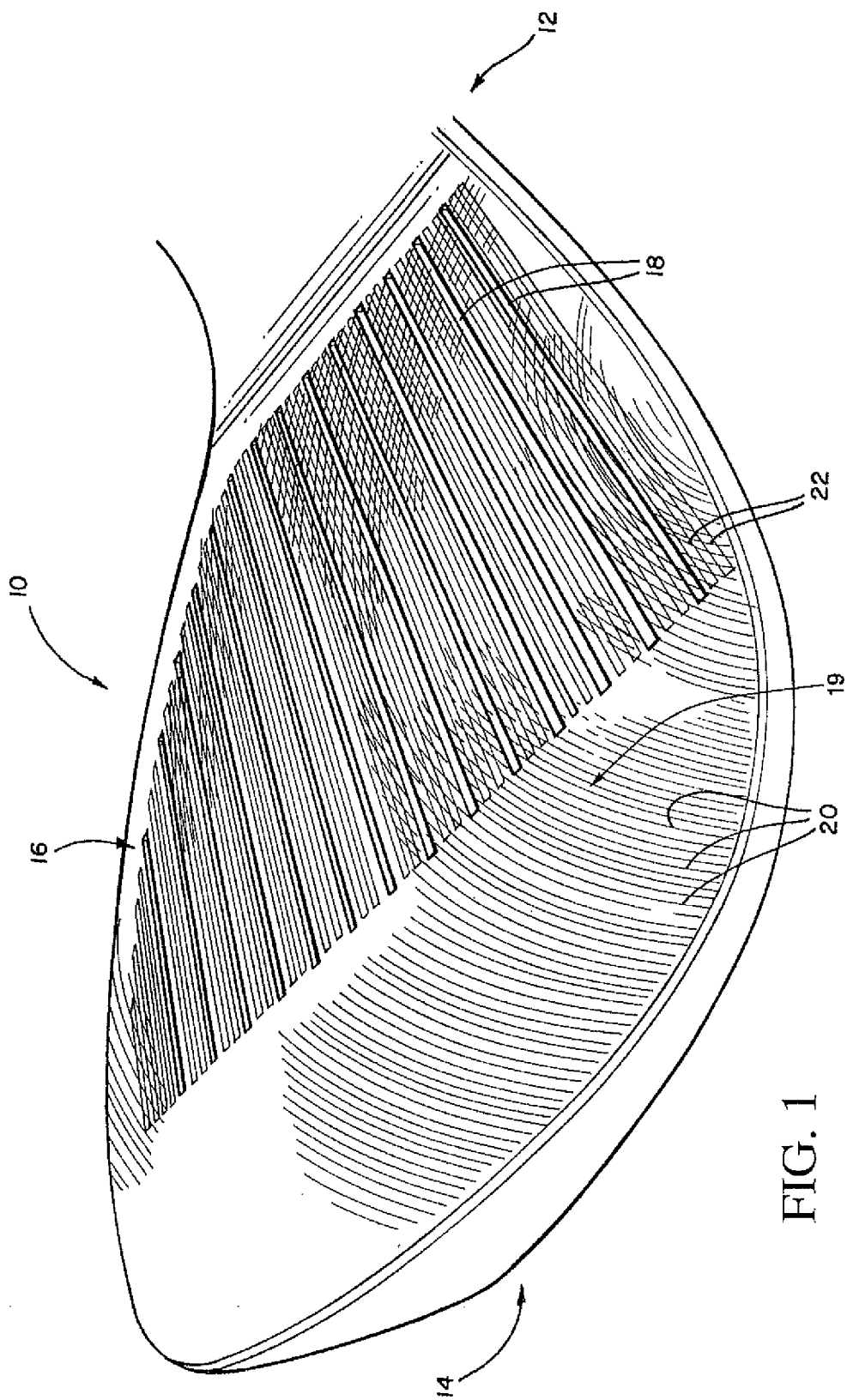
FIG. 1 is a front perspective view of a golf club head, showing a textured striking face in accordance with an embodiment of this disclosure.
Figure 2:
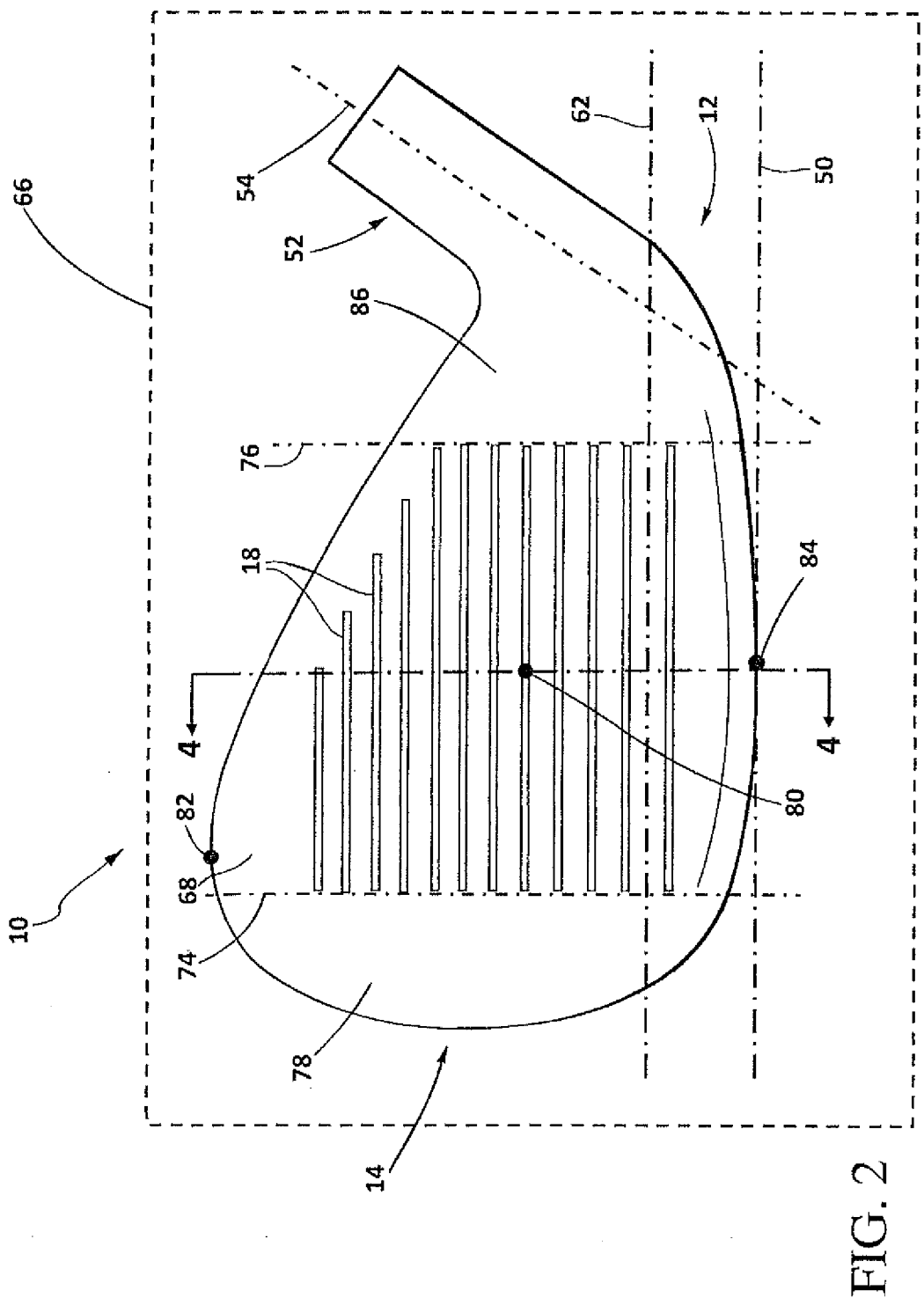
FIG. 2 is a front elevation view of the golf club head of FIG. 1.
Figure 3:
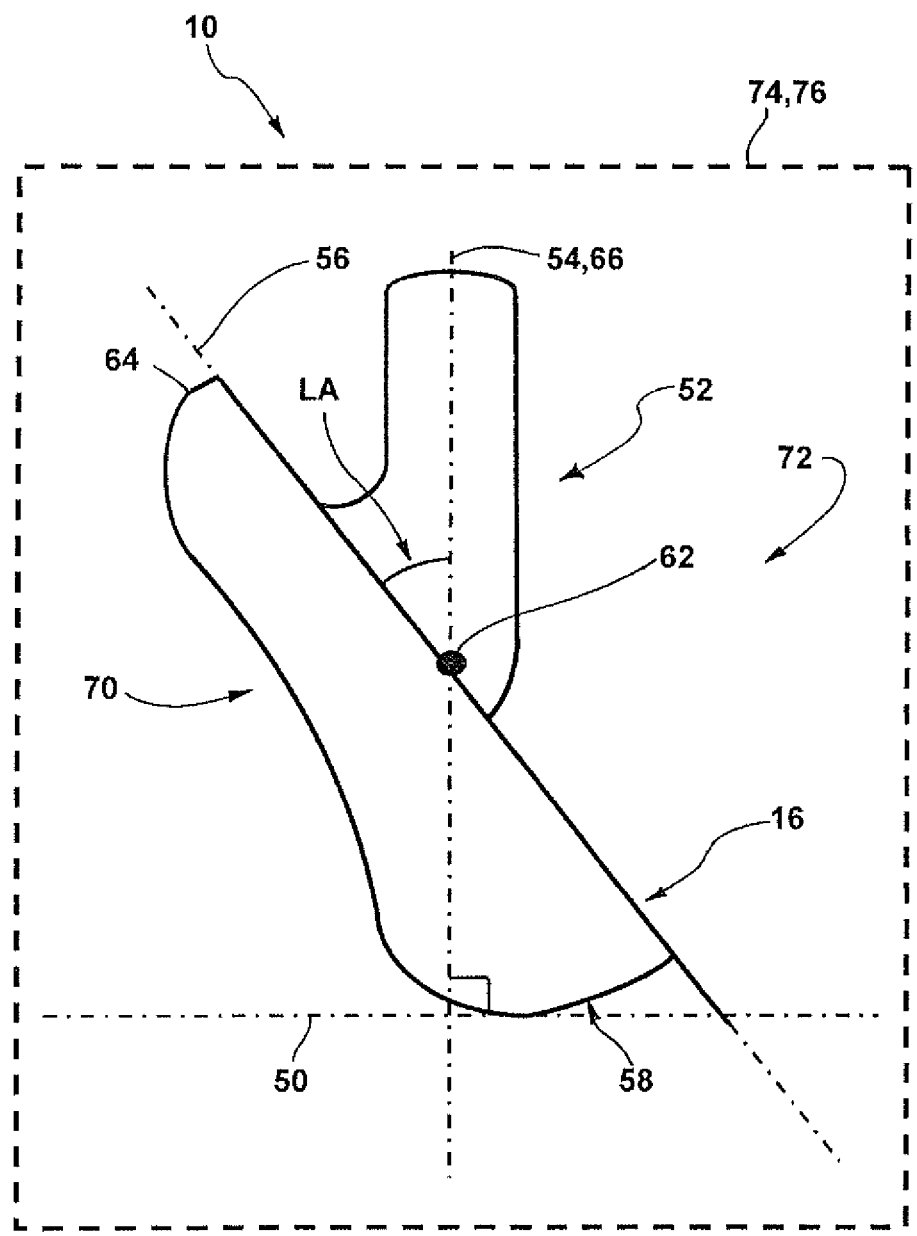
FIG. 3 is a toe side elevation view of the golf club head of FIG. 1.

Referring first to FIGS. 1 through 3, a golf club head 10 of the iron-type includes a heel portion 12, a toe portion 14 opposite the heel portion 12, a front portion 72, and a rear portion 70 opposite the front portion 72. The golf club head 10 further includes a top portion 64 and a sole (bottom) portion 58 opposite the top portion 64. The heel portion 12 further includes a hosel 52 extending therefrom for associating the golf club head 10 with a shaft (not shown). The hosel 52 defines a virtual central hosel axis 54. The front portion 72 further includes a striking face 16, defined as the planar exterior surface portion of the front portion 72 that generally conforms to a virtual striking face plane 56 and is adapted to contact a golf ball at a factory-designated loft angle LA (see FIG. 3). The striking face 16 is formed with surface features that increase traction between the striking face and a struck golf ball, for both ensuring good contact with the ball (for example, in wet conditions), and imparting a degree of spin to the ball, e.g. for stability in flight. Included in these surface features is a grid of substantially parallel horizontal grooves or score lines 18. The score lines 18 and the other surface features will be described in detail below.

The golf club head 10 is preferably formed of a metal, e.g. titanium, steel, stainless steel, or alloys thereof. More preferably, the main body of the club head 10 is formed of 431 stainless steel or 8620 stainless steel. In some embodiments, the main body of the club head is integrally or unitarily formed, while in other embodiments, the main body is formed of plural components that are welded together or otherwise permanently associated with each other. For example, in some embodiments, the club head 10 is formed of a main body of a first material, and a striking wall (including the striking face 16) of a second material different from the first, and welded to the main body.

Referring to FIGS. 2 and 3, the golf club head 10 is shown in a "reference position." As used herein, "reference position" denotes a position of a golf club head, e.g. golf club head 10, in which the sole portion 58 of the golf club head 10 contacts a virtual ground plane 50 such that the hosel axis 54 of the hosel 52 lies in a virtual vertical hosel plane 66, which intersects the virtual striking face plane 56 to form a virtual horizontal line 62.

Referring specifically to FIGS. 2 and 3, a first virtual vertical plane 74 is perpendicular to the striking face plane 56 and passes through the ends of the score lines 18 proximate the toe portion 14. A second virtual vertical plane 76 is perpendicular to the striking face plane 56 and passes through the ends of the score lines 18 proximate the heel portion 12. The region of the striking face 16 toe-ward of the first virtual plane 74 constitutes a toe region 78 of the striking face 16. The region of the striking face 16 heel-ward of the second virtual plane 76 constitutes a heel region 86 of the striking face 16. The region of the striking face 16 between, and delimited by, the first and second virtual planes 74 and 76 constitutes a central region 68.

Referring specifically to FIG. 2, the striking face 16 further comprises a face center 80. The face center 80 is located equidistant between the first virtual plane 74 and the second virtual plane 76. The face center 80 is also equidistant between an uppermost point 82 of the striking face 16 and a lowermost point 84 of the striking face 16.

In alternative embodiments, the golf club head 10 is of a type other than an iron-type as described above. Nonetheless, the type and, relatedly, the loft angle of the golf club head 10 are preferably selected such that the effect of any imposed surface texture described below, on ball trajectory, is desirable. For example, backspin production is generally a more desirable feature of high-lofted iron-type clubs and wedges. As the golfer nears the pin, precision in golf shots generally becomes more critical than other considerations, such as distance. As another example of desirability, the effect of traction between a striking face and a golf ball is understood to categorically differ between differently-lofted club heads. Golf balls, over the duration of contact with a club head having a relatively low loft angle, have been observed to follow a retrograde motion, i.e., they travel upwardly, change course, and return downwardly, resulting in forward spin. Golf balls, over the duration of contact with a club head having a relatively high loft angle, have been observed to travel only upwardly, resulting in backspin. Because of these considerations, the striking face surface textures variously described below are preferably applied to a club head of a loft angle no less than about 15°, more preferably no less than about 18°, and even more preferably no less than about 35° (e.g. a wedge-type golf club head).

As shown in FIGS. 1 and 2, the striking face 16 includes a grid comprising a plurality of substantially horizontal score lines 18, typically formed by mechanical milling (e.g. spin-milling). Alternatively, in some embodiments, the score lines 18 are formed by stamping, casting, or other known method. The score lines 18 typically have an average width no less than 0.1 mm, more preferably between about 0.25 mm and 1.0 mm, and even more preferably, substantially equal to about 0.90 mm. For all purposes herein, score line width is to be determined using the "30 degree method of measurement" (as described in Appendix II of the USGA Rules of Golf, Effective Jan. 1, 2012). Additionally, or alternatively, the score lines 18 have an average depth of no less than about 0.10 mm, more preferably between about 0.25 and about 0.60 mm, and most preferably substantially equal to about 0.51 mm. The length and number of score lines 18, and the spacing between them, are generally selected as to conform to USGA regulations. For all purposes herein, the "depth" of a score line, e.g. score lines 18, is measured from the general planar surface of the striking face 16, which thus constitutes a datum plane. Additionally, or alternatively, the score lines 18 each have a maximum width and a maximum depth within the respective ranges of average width and average depth discussed above.

The striking face 16 is also provided with a first textured surface pattern 19 comprising a first plurality of very narrow, relatively shallow grooves 20, which may be called "micro-grooves." The first plurality of micro-grooves 20, which may be formed by precision mechanical milling (e.g., CNC milling), is advantageously formed as a pattern of substantially parallel, arcuate lines intersecting the score lines 18. One of ordinary skill in the art will appreciate that such parallel arcuate grooves, when formed by a conventional milling process, will tend to slightly converge in the heelward and toeward directions. In the present disclosure such arcuate grooves are still considered substantially parallel despite the slight convergence.

In the illustrated embodiments, each of the arcuate micro-grooves 20 follows an arcuate path having a radius of curvature. As such, each arcuate path is a portion of a circular arc, and the radius is taken from a center point of the circle, which can be termed a center of curvature. Thus, in this disclosure a center of curvature can be a center point from which the radius of curvature of a particular arcuate path is taken, so that the arcuate path curves about its center of curvature.

In the illustrated embodiment, preferably the radius of curvature of each arcuate micro-groove 20 is substantially the same. In some embodiments, the radius of curvature is between about 2-4 inches, and more preferably is about 3 inches. As such, a center of curvature of each micro-groove would not be on the striking face 16. In the illustrated embodiment each of the arcuate micro-grooves 20 follows an arcuate path that is generally convex relative to the virtual ground plane 50. Such paths each have a center of curvature that is spaced from the striking face 16 and below the virtual ground plane 50. In some embodiments the micro-grooves can follow an arcuate path that is generally concave relative to the virtual ground plan 50. Such paths could each have a center of curvature above the striking face 16. In still other embodiments the micro-grooves could be tilted so as to be concave or convex relative to, for example, the first virtual vertical plane 74.

It is to be understood that, in other embodiments, the arcuate paths of the micro-grooves 20 may not all have the same radius of curvature. For example, in some embodiments each of the micro-grooves may curve about the same center. In still other embodiments, the arcuate paths of the micro-grooves may be generally parabolic.

The first textured surface pattern 19 formed by the micro-grooves 20 preferably covers at least the central region 68 of the striking face, and preferably extends at least partly into the toe region 78. More preferably, the first textured surface pattern 19 extends at least partly into the toe region 78 and the heel region 86. Preferably, the first textured pattern extends toward the toe portion past the uppermost point 82 of the club head 10 (see FIG. 2). In some embodiments, the first textured pattern covers the majority, and in some cases the entirety, of the toe region 78 of the striking face 16. Alternatively, or in addition, the first textured surface pattern 19 covers the entirety of the striking face 16 of the club head 10.

Figure 5A:
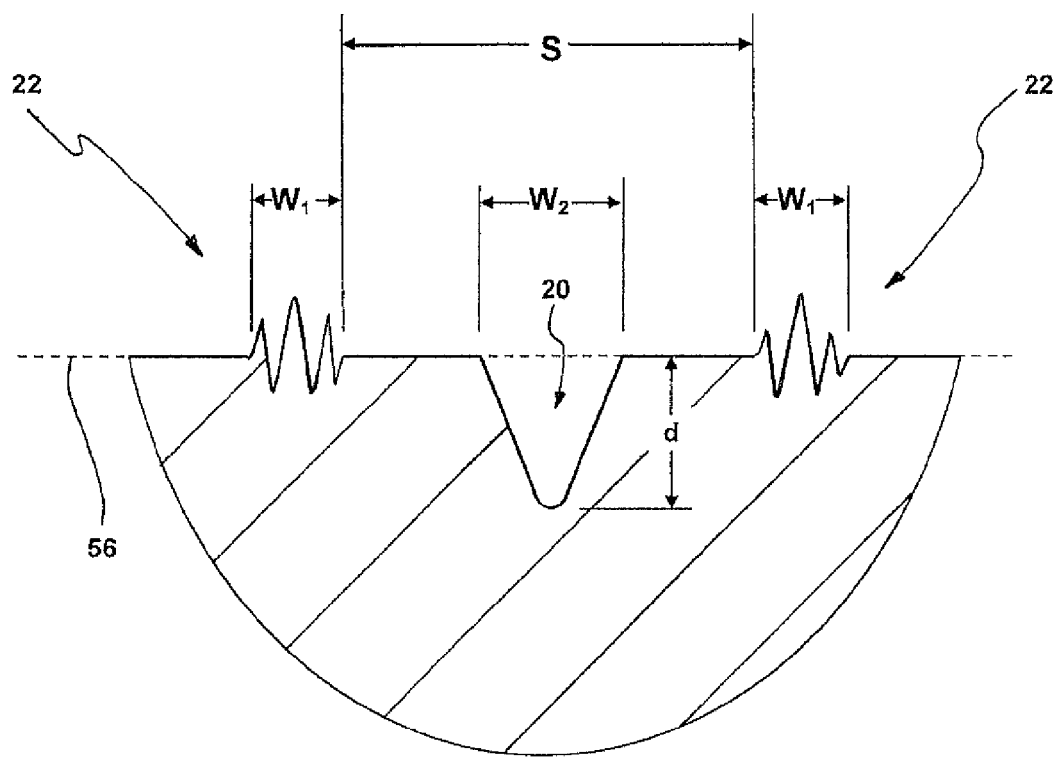
FIG. 5A is a detail view of a portion of the cross-sectional view of FIG. 5.

The micro-grooves 20 preferably have an average depth (measured in accordance with depth d as shown in FIG. 5A) no greater than 0.025 mm (1000 μin.), more preferably between 0.015 mm (600 μin.) and 0.025 mm (1000 μin.), and even more preferably between 0.020 mm (800 μin.) and 0.025 mm (1000 μin). Additionally, or alternatively, the micro-grooves 20 preferably have an average width (measured in accordance with width $w_2$ of FIG. 5A) of between 0.25 mm (0.010 in.) and 0.51 mm (0.020 in.), more preferably between 0.30 mm (0.012 in.) and 0.43 mm (0.017 in.). The dimensions of the micro-grooves 20 and the spacing between them will have a significant effect on the value of $R_a$ of the striking face. Thus, these dimensional parameters must be selected so that the maximum permitted value of $R_a$ noted above is not exceeded. However, because of normal surface variation and machine tolerances, a sample pool of club heads having micro-grooves intended to effect a specific target surface roughness $R_a$ value may likely effect surface roughness $R_a$ values dispersed about a range. Consequently, as a practical matter, the first textured surface pattern is preferably selected to produce an average value of $R_a$ close to, but still somewhat less than, the desired optimal value of $R_a$. Likewise, the first textured surface pattern also produces a first value of $R_t$, (which may be termed "$R_{t1}$"), that may advantageously be somewhat less than the desired optimum value of $R_t$.

The striking face 16 is further provided with a second textured surface pattern superimposed on the first textured surface pattern 19 at least in the region of the striking face occupied by the score lines 18 (i.e. the central region 68). The second textured surface pattern is advantageously provided by a series of textured or roughened regions, each of which is formed between an adjacent pair of score lines 18. In the illustrated exemplary embodiment, the textured or roughened regions are formed as a plurality of interposed textured surface treatment regions 22, with at least one, and preferably two or more, of the plurality of the textured surface treatment regions 22 formed between each adjacent pair of score lines 18. The textured surface treatment regions 22 are advantageously configured and formed as horizontal etch lines, as described in detail below. In some embodiments, as shown e.g. in FIG. 1, adjacent pairs of horizontal etch lines are coupled by vertical end lines.

Preferably, the club head 10 includes the textured surface treatment regions 22 in a repetitive pattern having a surface density of four such regions 22 extending horizontally between each pair of the score lines 18. In alternative embodiments, the textured surface treatment regions 22 are generally linear and extend obliquely, i.e. at an angle relative to the ground plane 50 (e.g. between 5° and 25°, measured in the striking face plane 56), when the club head 10 is in the reference position. In yet other embodiments, the textured surface treatment regions 22 follow an arcuate path and/or an intermittent path. However, the textured surface treatment regions 22 preferably extend horizontally, and in parallel relation to each other. These configurations and orientations aid a golfer in aligning the club head 10 and avoid—in combination with the first textured surface pattern (e.g. the micro-grooves 20)—an interference pattern that may distract or irritate the golfer, thus negatively affecting performance. Preferably, the interposed textured surface treatment regions 22 are spaced from any score lines 18. This provides for maintained structural integrity of, and thus an enduring effect on performance by, the score lines 18.

Figure 6:
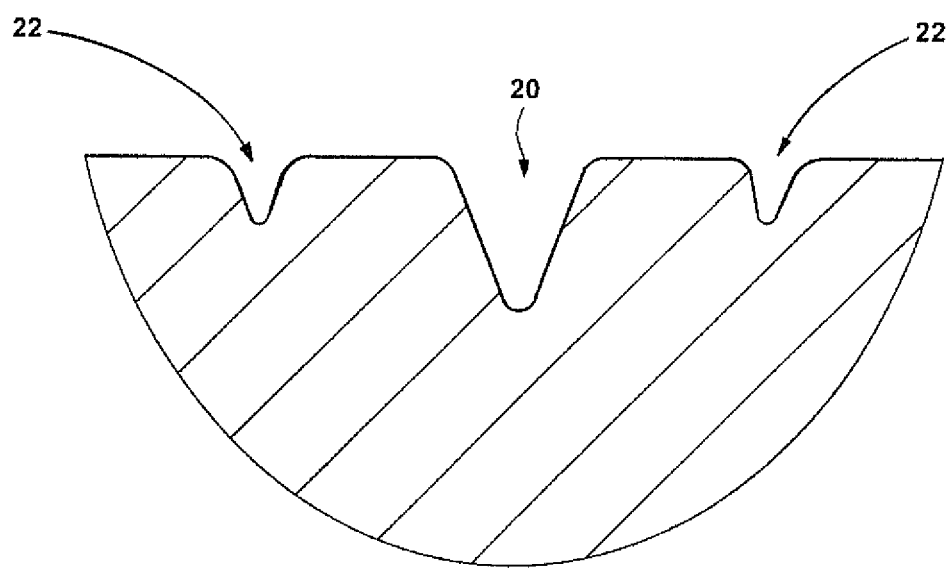
FIG. 6 is detail view of a portion of the cross-sectional view of FIG. 4 according to another embodiment of this disclosure.
Figure 7:
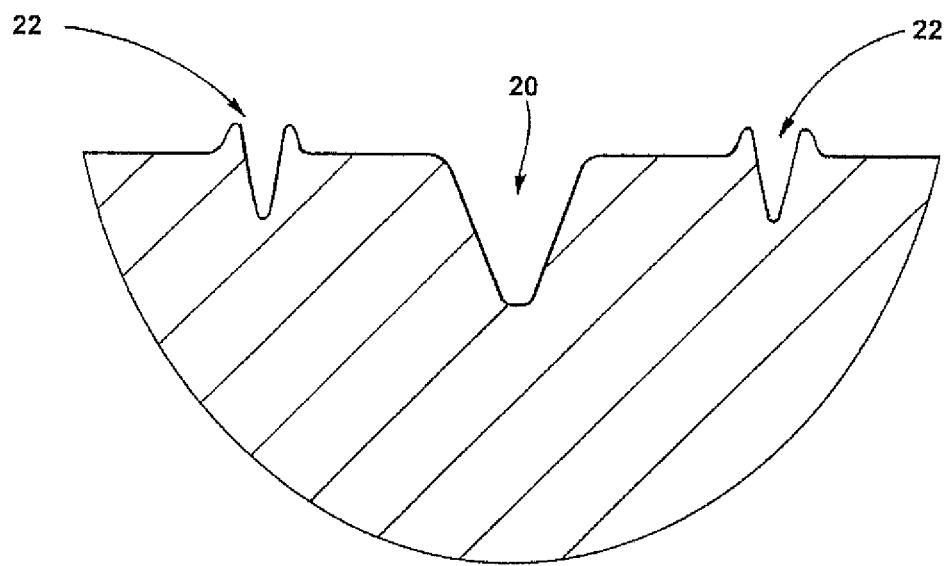
FIG. 7 is a detail view of a portion of the cross-sectional view of FIG. 4 according to another embodiment of this disclosure.

An exemplary textured striking face configuration is shown in FIG. 4. The score lines 18, micro-grooves 20, and the textured surface treatment regions 22 are not shown to scale, and the illustrated cross-sectional shapes of these features are exemplary only. For example, the textured surface treatment regions 22 may have a generally U-shaped cross-section, as shown, or they may have an irregular cross-section, depending on the particular way they are formed, as described below. In FIG. 5A, each of the textured surface treatment regions 22 is shown as having a width $W_1$ and an irregular cross-section. However, in alternative embodiments, the textured surface treatment regions 22 are generally U-shaped in cross-section (see, e.g., FIGS. 5 and 6), and may optionally have raised edges (see, e.g., FIG. 7).

In any previously-described embodiment, each textured surface treatment region 22 is defined as a region of the striking face having textural characteristics that contrast with the general texture of its surrounding area, which texture generally corresponds to the process by which it is formed. In addition, preferably, each textured surface treatment region also constitutes a coterminous region that is visually distinct from its surrounding area, such as, for example, having a distinct color, light reflectance property, or other visual quality.

The textured surface treatment regions 22 are preferably of a scale less than that of the score lines 18, to ensure that the configuration of the striking face 16 conforms to USGA regulations. For example, the textured surface treatment regions 22 preferably each have an average width (measured in accordance with $w_1$ of FIG. 5A) no less than 0.01 mm, more preferably no less than 0.10 mm, and even more preferably between about 0.10 mm and about 1.0 mm. Additionally, or alternatively, the textured surface treatment regions 22 include a maximum width of a value similar to the values described with regard to average width.

Superimposing the second textured surface pattern on the first textured surface pattern 19 increases the value of $R_t$ of the striking face 16 from $R_{t1}$ to a higher value ($R_{t2}$). Therefore, the dimensions of the textured surface treatment regions 22 of the second textured surface pattern should be selected so that $R_{t2}$ does not exceed the above-noted maximum permitted value of $R_1$.

The textured surface treatment regions 22 of the second textured surface pattern may be mechanically milled, but, as described below, in a preferred embodiment, they are laser-etched into the striking face 16. One advantage of laser etching is believed to be that the surface texture created by the removal of metal (e.g. by vaporization and/or by sloughing off micro-flakes) by the laser in forming the textured surface treatment regions 22 provides a particularly effective spin-enhancing frictional engagement with the elastomer coating of a struck golf ball. Moreover, laser-etching, as combined with the mechanical milling used to form the first textured surface pattern (i.e., the micro-grooves 20), allows the value of $R_t$ to be controlled quite precisely, and it reduces the dispersion of the values of $R_a$, thereby allowing the value of $R_a$ achieved by milling the micro-grooves 20 to assume an average value closer to the above-noted maximum permitted value. Laser etching also, by its nature, constitutes a localized heat treating operation. Thus, the regions structurally affected by the laser etching process, i.e. the textured surface treatment regions 22, also constitute coterminous heat-treated regions.

Alternative, or additional, processes for forming the textured surface treatment regions 22, which may achieve one or more of the above advantages, include chemical etching, local media blasting (e.g. peening or sandblasting), local oxidizing or other chemical roughening process, micro-milling, or local coating of the striking face 16 with a rough material.

Figure 8:
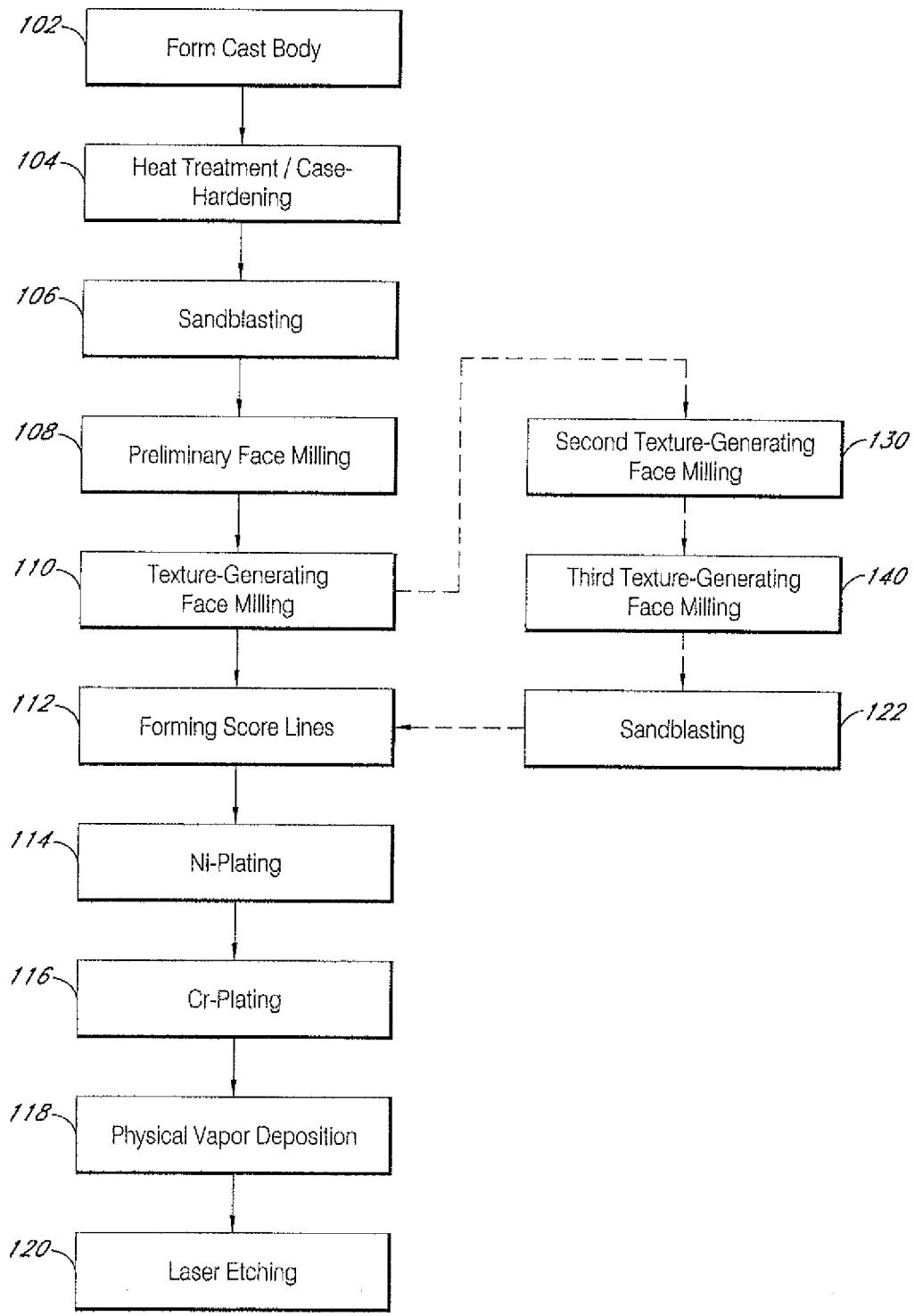
FIG. 8 is a flow chart illustrating a method of forming a textured striking surface on a golf club head in accordance with an embodiment of this disclosure.

Referring to FIG. 8, an exemplary process 101 for forming the striking face texture of FIG. 1 is shown. FIGS. 9-12 illustrate the club head 10 after performance of the steps of the process 101 shown in FIG. 8. In each of FIGS. 9-12, the club head 10 is oriented such that the striking face plane 56 coincides with the plane of the paper. The relative order of the various steps of the process 101 is for purposes of exemplification. One of ordinary skill in the art would appreciate that, unless indicated otherwise, various steps of the process 101 may be omitted, or the relative order of such steps may be altered without departing from the spirit and scope of the invention.

In step 102, a club head body is cast. In alternative embodiments, a main body is formed by forging and/or machining. Once formed, in step 104, the club head body optionally undergoes a heat treatment process, whereby the club head body is case-hardened. Alternatively, or in addition, the club head body is cold-worked or otherwise forged to more advantageously tailor the body's material properties.

Next, in step 106, the main body is optionally polished by means of a sandblasting process (or other media blasting process). This step 106 helps to remove any burrs or flashing that may have resulting from the casting operation. In addition, the sandblasting process provides a foundation for an aesthetically pleasing final product.

Once sandblasted, in step 108, the main body undergoes a preliminary milling operation particularly directed at the striking face 16. The preliminary milling operation is preferably carried out using a machine bit, feed rate, and spin rate such that a resulting roughness value, e.g. $R_a$ value, is relatively low (e.g. an $R_a$ value less than 0.0033 mm or 130 µin.). In practical terms, this process is carried out as to preferably not result in any visually discernible ridges (e.g. using a cutting bit having a profile of a sufficiently high radius of curvature). In this manner, further texture-enhancing processes may effect a final striking face 16 having metrological properties closer to target and more consistent from sample to sample.

Figure 9:
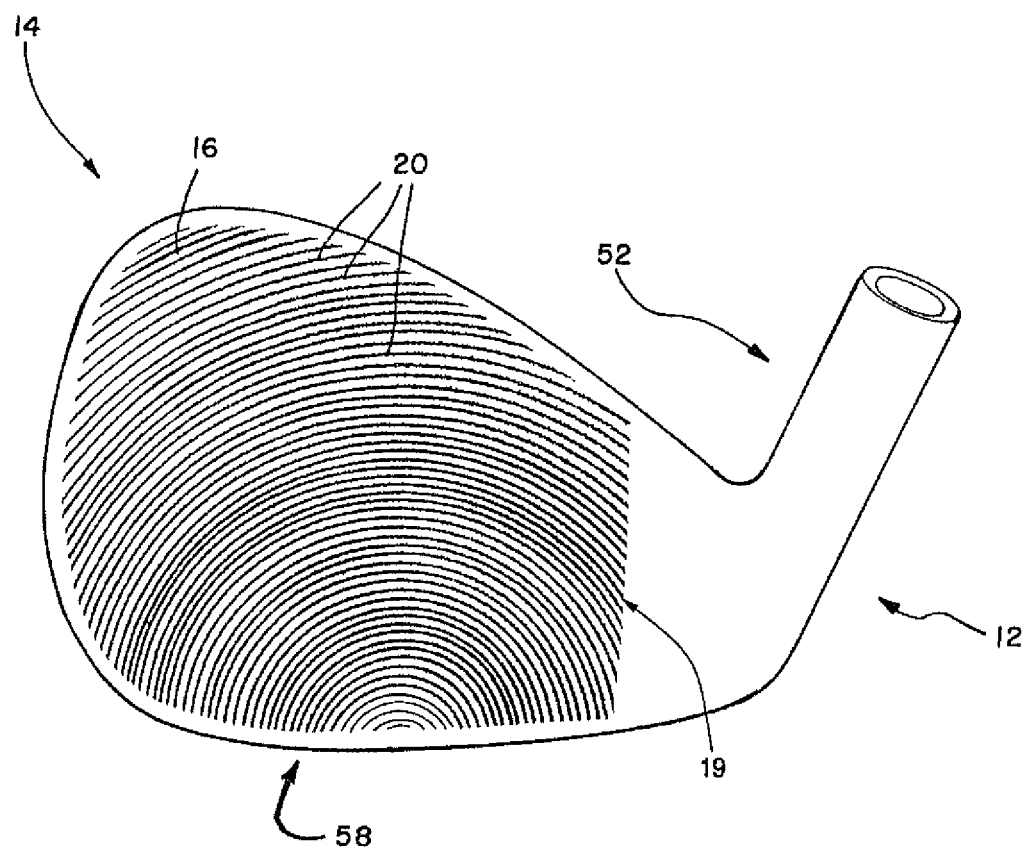
FIGS. 9-11 are front views of a portion of a golf club head with a striking face plane corresponding to the plane of the paper, that show the steps of forming a spin-imparting textured striking face in accordance with an embodiment of this disclosure.

After the preliminary milling operation of step 108, the striking face 16 is milled under a different set of machining parameters to provide a milled surface having different visual and tactual characteristics, e.g. to produce the micro-grooves 20 discussed above, in step 110. FIG. 9 shows the striking face 16 after the micro-grooves 20 have been formed by mechanical milling, optionally using CNC, to create the first textured surface pattern 19. In alternative embodiments, an arcuate ridge pattern is stamped into the striking face 16 of the club head body. In the illustrated exemplary embodiment, the first textured surface pattern 19 comprises a plurality of closely-spaced, substantially parallel, arcuate micro-grooves 20 that extend over substantially all of the striking face 16, as defined above. In a particular example, the micro-grooves 20 produced by this step are spaced (from center to center) by a distance preferably no more than about 1.0 mm (0.04 in.), more preferably within the range of about 0.25 mm (0.01 in.) to about 1.0 mm (0.04 in.), and even more preferably equal to about 0.6 mm (0.024 in.). Also, after step 110, the club head striking face 16 preferably has an $R_a$ value no less than about 0.0027 mm (110 μin.), more preferably within the range of about 0.0030 mm (120 μin.) and 0.0043 mm (170 μin.), and even more preferably equal to about 0.0032 mm (125 μin.). Additionally, or alternatively, the striking face 16, in this intermediate state, has an $R_t$ value of about 0.014 mm (550 μin.).

In the embodiments discussed above, the second textured surface pattern is superimposed on the first textured surface pattern 19. It is to be understood, however, that in other embodiments the first textured surface pattern may have other shapes and configurations. It is to be understood that the above-described principles also will apply to such other embodiments.

Figure 13:
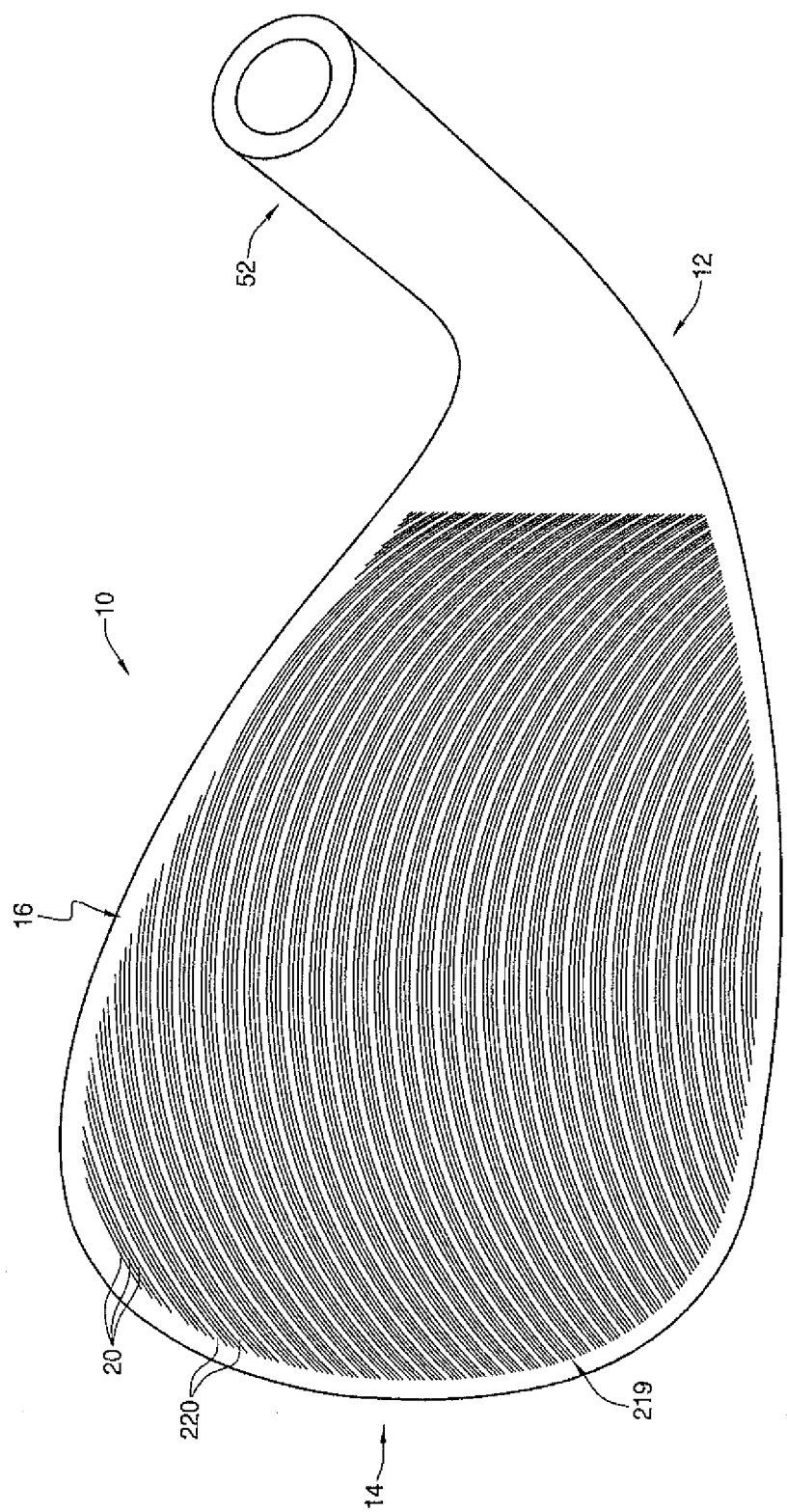
FIG. 13 is a front view of another embodiment of a golf club head with a striking face plane corresponding to the plane of the paper, and in which the striking face has a second micro-groove pattern superimposed on a first micro-groove pattern.
Figure 13A:
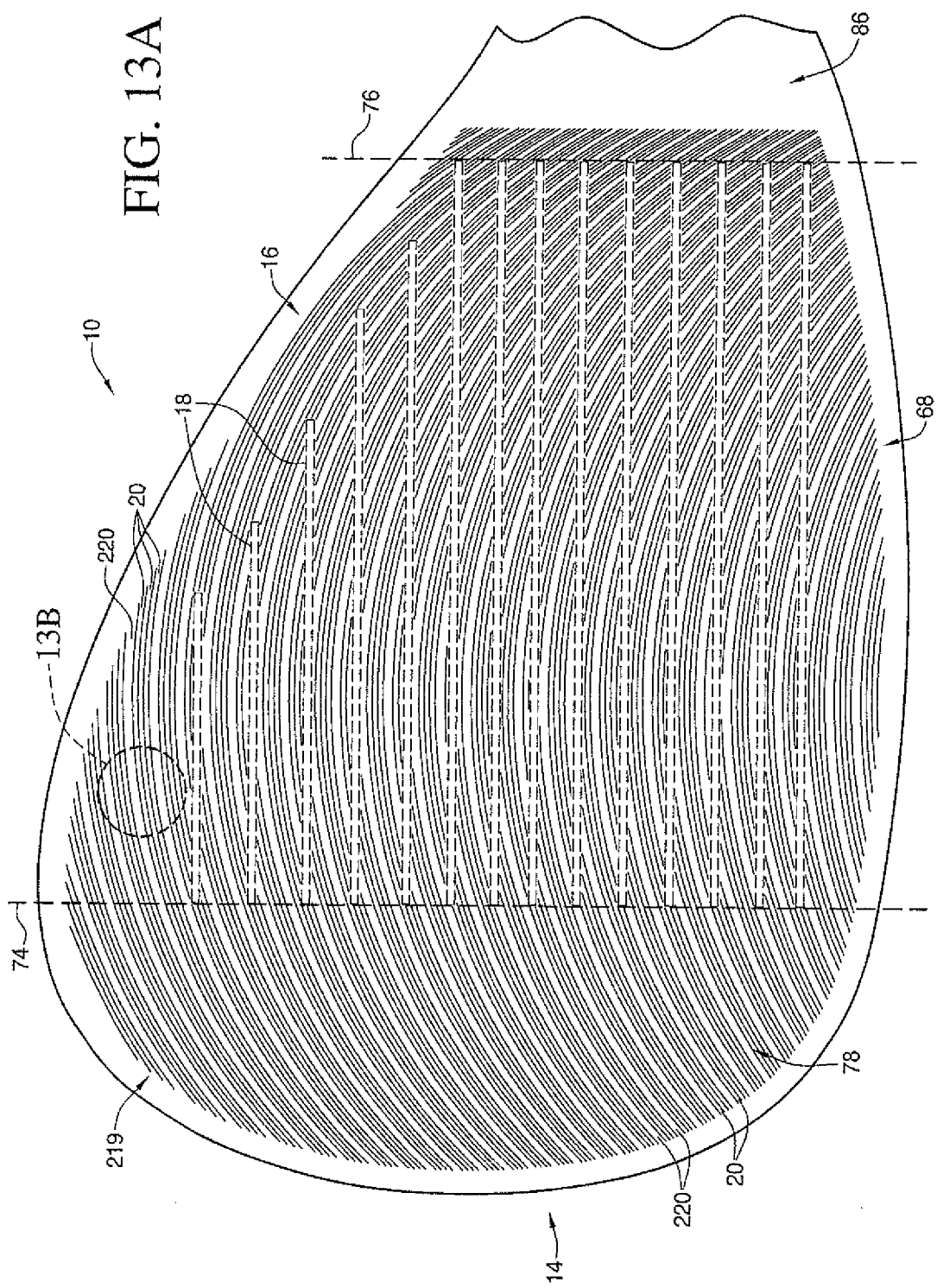
FIG. 13A is another front view of the golf club head of FIG. 13.
Figure 13B:
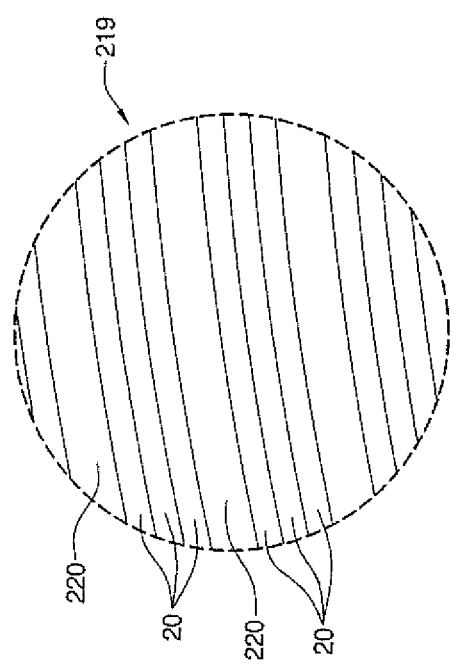
FIG. 13B is a partial close up view of a portion of the striking face of the golf club head of FIG. 13A corresponding to the portion of the striking face bounded by line 13B of FIG. 13A.
Figure 13C:
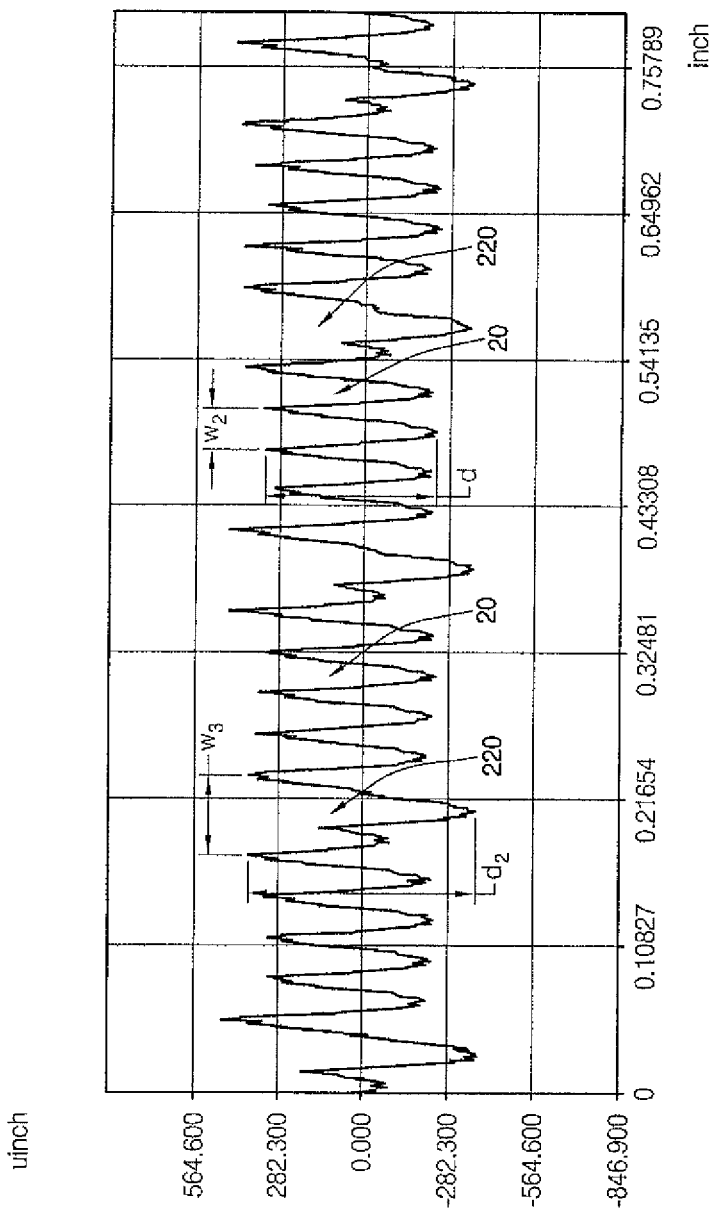
FIG. 13C shows a roughness curve of a portion of the striking face of the golf club head of FIG. 13A moving across the striking face in a direction transverse to micro-grooves.
Figure 13D:
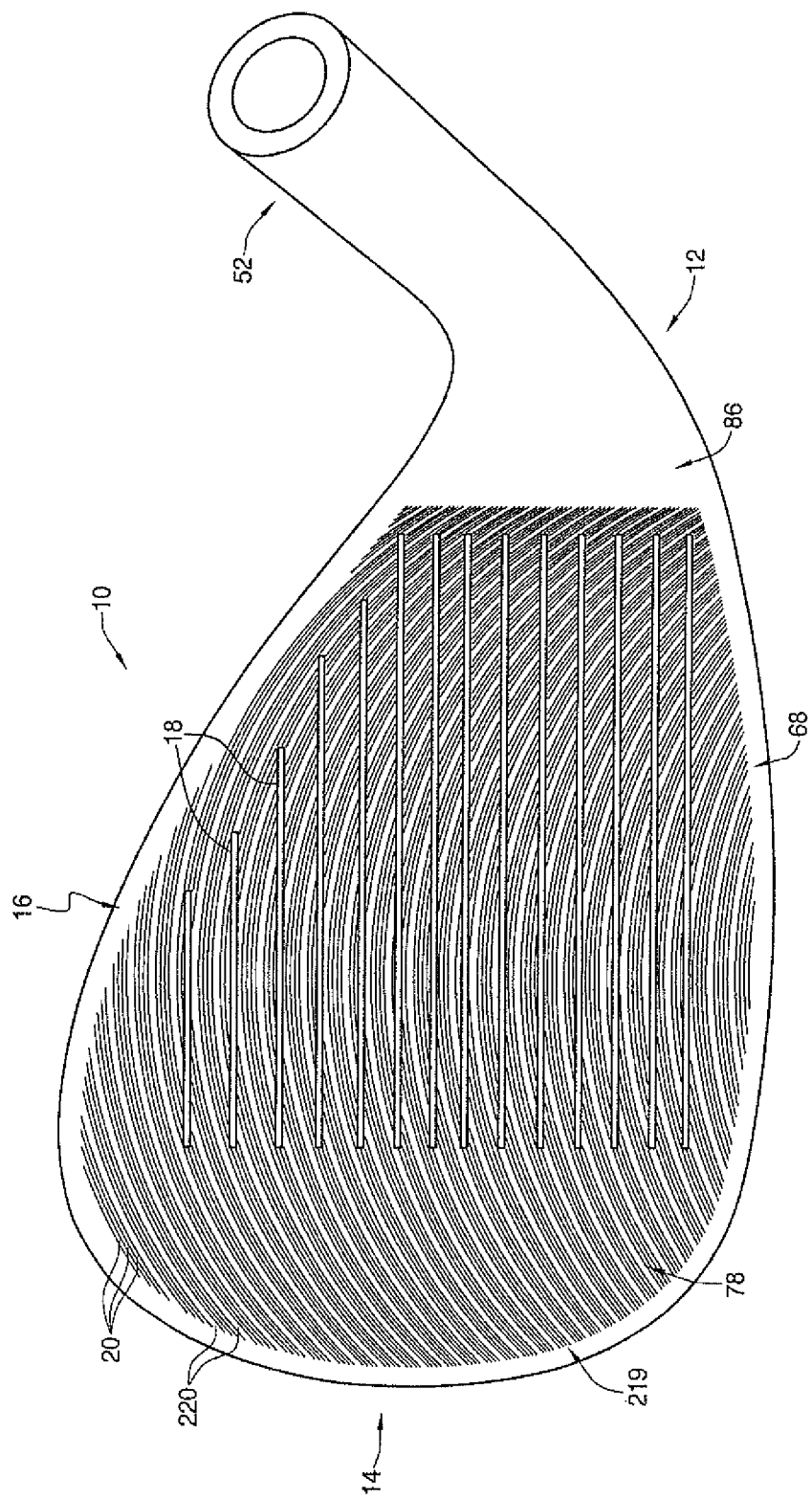
FIG. 13D is a front view of a golf club head according to one or more embodiments herein.

With reference again to FIG. 8 and also to FIGS. 13-13D, an additional embodiment of a first textured surface pattern 219 is shown. The illustrated first textured surface pattern 219 comprises first micro-grooves 20 formed by the texture-generating face milling operation 110 (see FIG. 8). Such micro-grooves 20 are arranged in a first milling pattern (also referred to as a first micro-groove pattern), as discussed above. As shown, the first micro-grooves 20 are substantially parallel to each other. For example, one of ordinary skill in the art would appreciate that such arcuate grooves, when formed by a conventional milling process, will tend to slightly converge in the heelward and toeward directions. After the first micro-grooves 20 are formed, a second texture-generating face milling operation 130 (FIG. 8) can be performed in which a plurality of second micro-grooves 220 are milled into the striking face 16. The second micro-grooves 220 preferably are milled in accordance with in a second milling pattern (also referred to as a second micro-groove pattern), which is superimposed on the first milling pattern to form the first textured surface pattern 219.

The second micro-grooves 220 of the second milling pattern preferably are arranged in a pattern of generally parallel, arcuate lines. For example, one of ordinary skill in the art would appreciate that such arcuate grooves, when formed by a conventional milling process, will tend to slightly converge in the heelward and toeward directions. In FIG. 13A, the score lines 18 are shown in phantom to indicate where they will be positioned when eventually applied, and as shown the first and second micro-grooves 20, 220 are arranged so as to intersect the score lines 18. Preferably, the score lines 18 are formed at step 112 after milling of the first and second micro-grooves 20, 220. As in the embodiment shown in FIG. 1, the score lines 18 of the club head 10 shown in FIGS. 13-13D preferably have a depth no less than 0.10 mm and are otherwise dimensioned to conform to USGA regulations. FIG. 13D shows a completed golf club head 10 having the score lines 18 as well as the first and second micro-grooves 20, 220.

Continuing with reference to FIGS. 13-13D, the second micro-grooves 220 preferably are formed by precision mechanical milling (e.g., CNC milling), like the first micro-grooves 20. Also, preferably the second micro-grooves 220 are parallel to the first micro-grooves 20, and thus are convex relative to a virtual ground plane (i.e. form "frowns" when the club head is oriented in an address position) and have substantially the same radii of curvature. However, in alternative embodiments, micro-grooves 20 and/or micro-grooves 220 are concave relative to the virtual ground place (i.e. form "smiles" when the club head is oriented in an address position). In the illustrated embodiment, adjacent second micro-grooves 220 are spaced farther apart from one another than are adjacent first micro-grooves 20. Thus, more than one, and preferably a plurality, of the first micro-grooves 20 are disposed between adjacent second micro-grooves 220. In the illustrated embodiment three first micro-grooves 20 are disposed between adjacent second micro-grooves 220.

With continued reference to FIGS. 13-13D, in the illustrated embodiment, the second micro-grooves 220 are generally wider and deeper than the first micro-grooves 20. In one preferred embodiment, the second micro-grooves 220 are formed using the same or a similarly-shaped milling bit as was used to form the first micro-grooves. As such, the second micro-grooves 220 have a profile radius that is the same as that of the first micro-grooves 20. When forming the second micro-grooves 220, however, the milling bit is set for a slightly deeper cut and higher feed rate than was used when forming the first micro-grooves 20. This results in forming second micro-grooves 220 that are deeper than the first micro-grooves 20 and adjacent second micro-grooves 220 being spaced farther away from one another than are adjacent first micro-grooves 20. Also, the passing of the milling bit in the second milling process 130 results in removal of portions of asperities formed between first micro-grooves 20. This is shown in the roughness curve depicted in FIG. 13C. Note that second micro-grooves 220 are generally defined by asperity surface of first micro-grooves 20 in addition to surfaces formed by the second mill pass 130. The result is second micro-grooves 220 having a width equal to about twice the width of the first micro-grooves. In some embodiments second micro-grooves 220 are spaced (from center to center) by a distance preferably no more than about 0.25 in., more preferably within the range of about 0.1-0.2 in., and even more preferably about 0.14 in.

As discussed above, preferably the second micro-grooves 220 are deeper than the first micro-grooves 20. For example, in some embodiments the depth $d_2$ of the second micro-grooves 220 is 1.1-3 times the depth d of the first micro-grooves 20. More preferably depth $d_2$ is 1.2-2 times, and most preferably 1.5-1.7 times depth d. Specifically, with reference to FIG. 13C, the first micro-grooves 20 preferably have an average depth between 300 and 600 micro-inches, more preferably between 400 and 550 micro-inches, and most preferably equal to about 500 micro-inches (e.g. exemplary depth d is about 490 micro-inches). The second micro-grooves preferably have an average depth greater than the average depth of the first micro-grooves, more preferably between 400 and 700 micro-inches, even more preferably between 500 and 700 micro-inches, and most preferably equal to about 600 micro-inches (e.g. exemplary depth d2 is about 600 micro-inches).

In some embodiments the average width of the second micro-grooves 220 is selected to be a whole number multiple of the average width of the first micro-grooves. For example, in the illustrated embodiment, as shown in FIG. 13C, second micro-grooves 220 have removed asperities previously forming edges of first micro-grooves 20. The result is second micro-groove widths that are about twice the first micro-groove widths. E.g., the exemplary first micro-groove width $w_2$ is about 0.032 in. In contrast, a width $w_3$ of a second micro-groove 220 is about 0.060 in.

It is to be understood that, in further embodiments, the second milling pattern may not be so similar to the first milling pattern. For example, in some embodiments, the second micro-grooves 220 may not be parallel to the first micro-grooves 20. For example, in contrast to first micro-grooves 20, second micro-grooves may have different radii of curvature, may be concave or convex relative to the virtual ground plane or relative to the virtual vertical planes 74, 76, may have widths that are not whole number multiples of the widths of the first micro-grooves, may be thinner and/or shallower than the first micro-grooves 20, may be formed using a different milling bit and thus have a different profile radius than the first micro-grooves 20, and such.

Further, in other embodiments the first and second micro-grooves may be formed by procedures other than milling. For example, in some embodiments a first textured surface pattern 219, made up of a second micro-groove pattern superimposed on a first micro-groove pattern, can be stamped into the striking face 16 of the club head body.

As with the embodiments discussed above in connection with FIGS. 1-12, the first textured surface pattern 219 as illustrated in FIGS. 13-13D can cover at least the central region 68 of the striking face, and preferably extends at least partly into the toe region 78. More preferably, the first textured surface pattern extends at least partly into both the toe region 78 and the heel region 86. Preferably, the first textured pattern extends toward the toe portion past the uppermost point 82 of the club head 10 (see FIG. 2). In some embodiments, the first textured pattern covers the majority, and in some cases the entirety, of the toe region 78 of the striking face 16. Alternatively, or in addition, the first textured surface pattern can cover the entirety of the striking face 16 of the club head 10.

Figure 14:
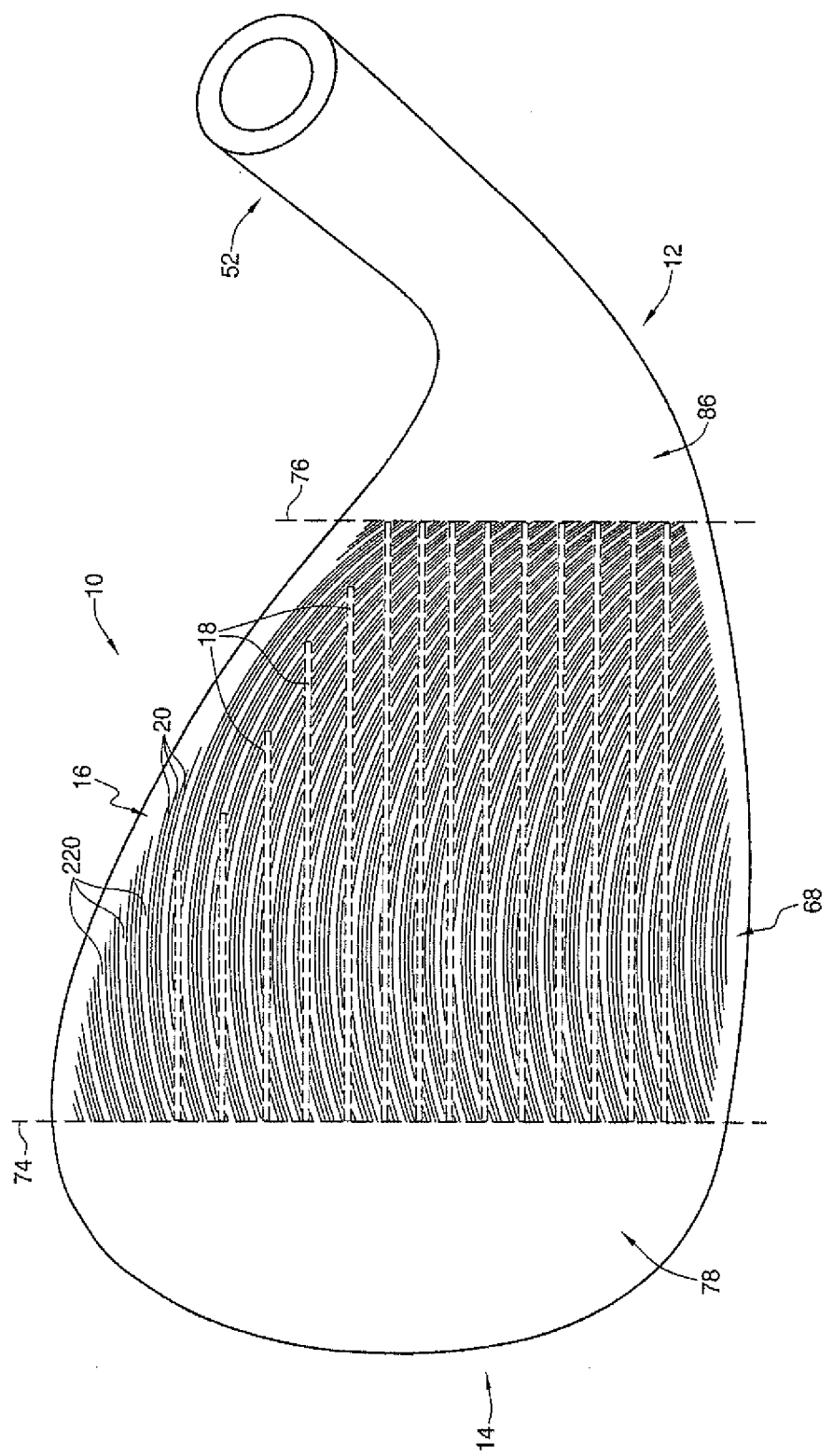
FIG. 14 is a front view of yet another embodiment of a golf club head with a striking face plane corresponding to the plane of the paper.

With reference next to FIG. 14, in another embodiment, the first textured surface pattern 219 may cover the central region 68 of the striking face, but does not extend substantially into the toe region 78. Similarly, in other embodiments the extent of the first textured surface pattern may be limited to, for example, the central region 68, and not extend substantially into one or both of the heel region 68 and toe region 78.

Figure 15:
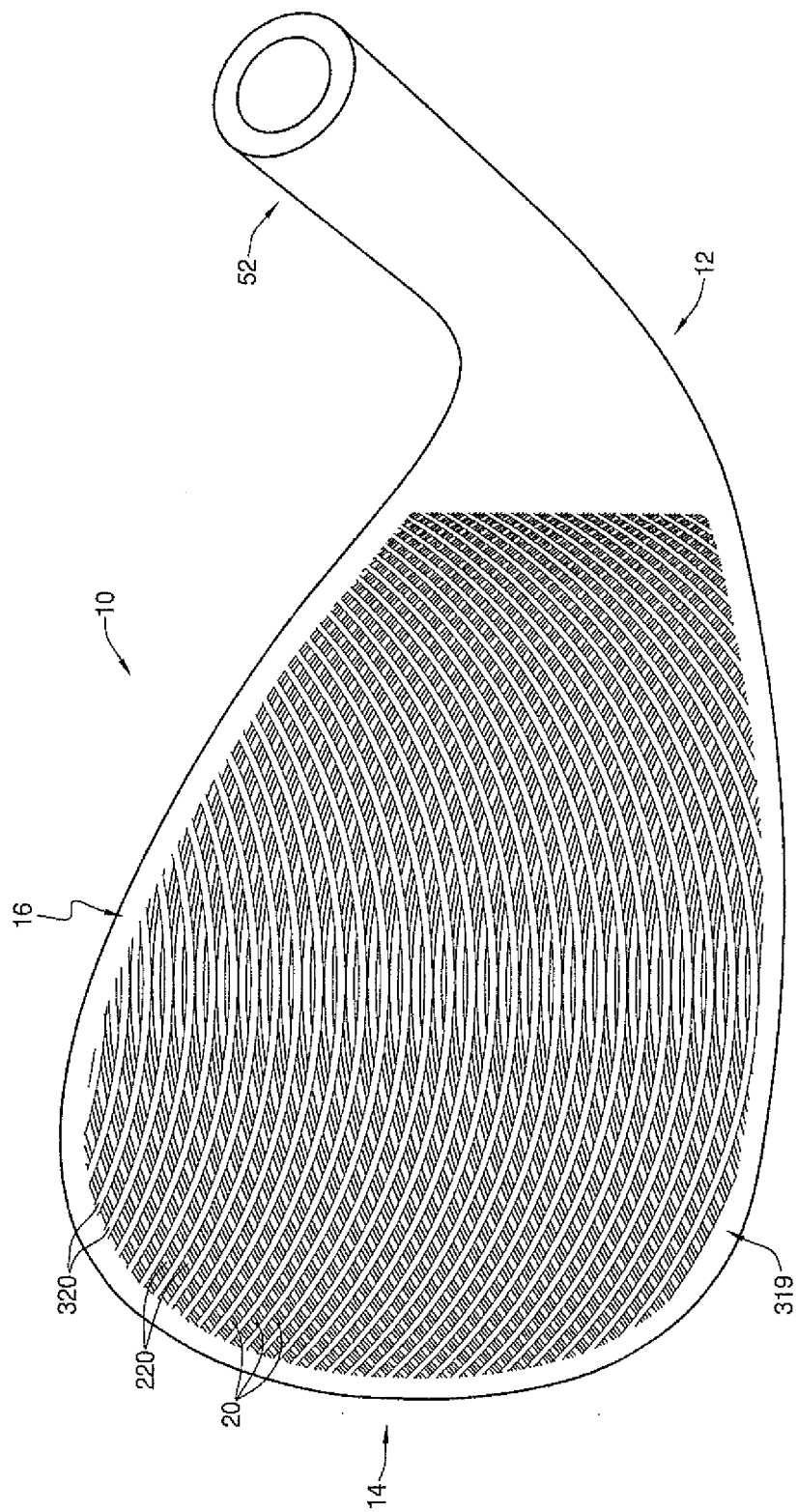
FIG. 15 is a front view of still another embodiment of a golf club head with a striking face plane corresponding to the plane of the paper, and in which the striking face has a third micro-groove pattern superimposed on first and second micro-groove patterns.
Figure 15A:
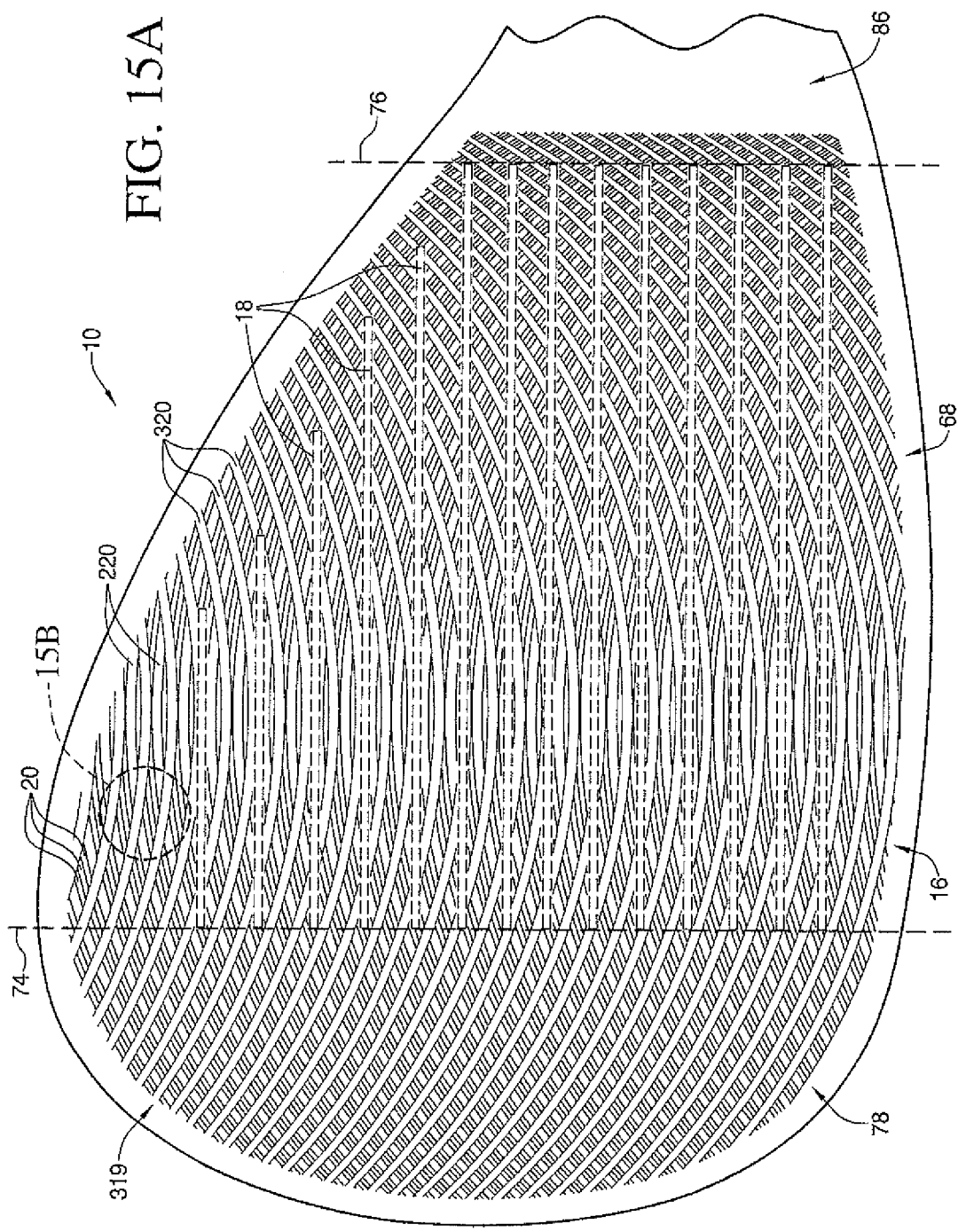
FIG. 15A is another front view of the golf club head of FIG. 15.
Figure 15B:
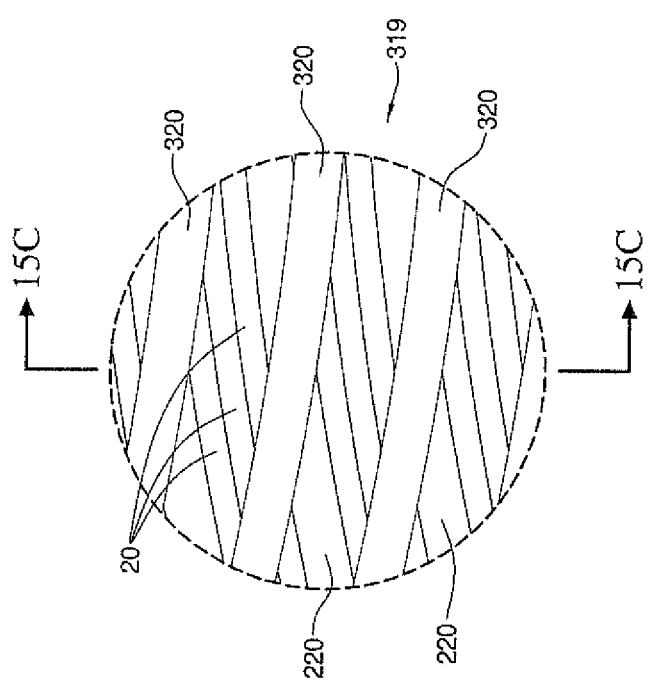
FIG. 15B is a partial close up view of a portion of the striking face of the golf club head of FIG. 15A taken at line 15B of FIG. 15A.

Referring next to FIGS. 8 and 15-15B, in another embodiment, after the second texture-generating face milling operation 130 is completed, a third texture-generating face milling operation 140 can be performed in which a plurality of third micro-grooves 320 are milled into the striking face 16. The third micro-grooves 320 preferably are milled in a third milling pattern (also referred to as a third micro-groove pattern), which is superimposed on the first and second milling patterns to form another embodiment of first textured surface pattern 319. As shown in FIGS. 15A and 15D, score lines 18 can be formed on the striking face 16 in addition to the micro-grooves 20, 220, 320. Further textured surface treatment regions 22 can also be formed on the striking face 16.

In the illustrated embodiment, the third micro-grooves 320 of the third milling pattern are arranged in a pattern of parallel, arcuate lines that substantially mirror the second micro-grooves 220 of the second milling pattern. More specifically, the third milling pattern is identical to the second milling pattern, but rotated 180° so as to be concave relative to the virtual ground plane. For example, the third micro-grooves 320 have the same depth, width and spacing as the second micro-grooves 220, and even have the same arcuate shape (e.g., same radii of curvature) except for the 180° rotation. The third micro-grooves 320 can even be formed using the same or a similarly-shaped milling bit as was used to form the second micro-grooves 220 and/or first micro-grooves 20.

Figure 15C:
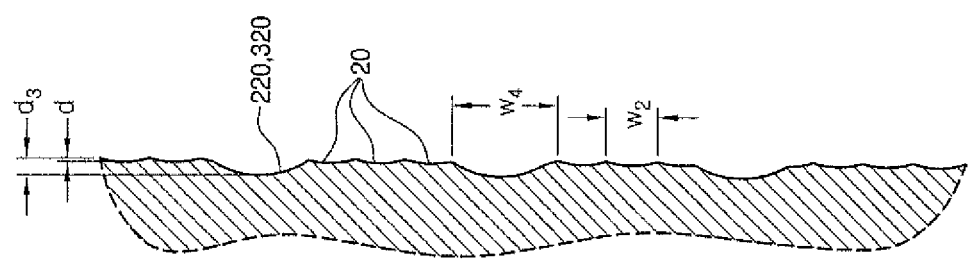
FIG. 15C shows a cross section taken along line 15C-15C of FIG. 15B.
Figure 15D:
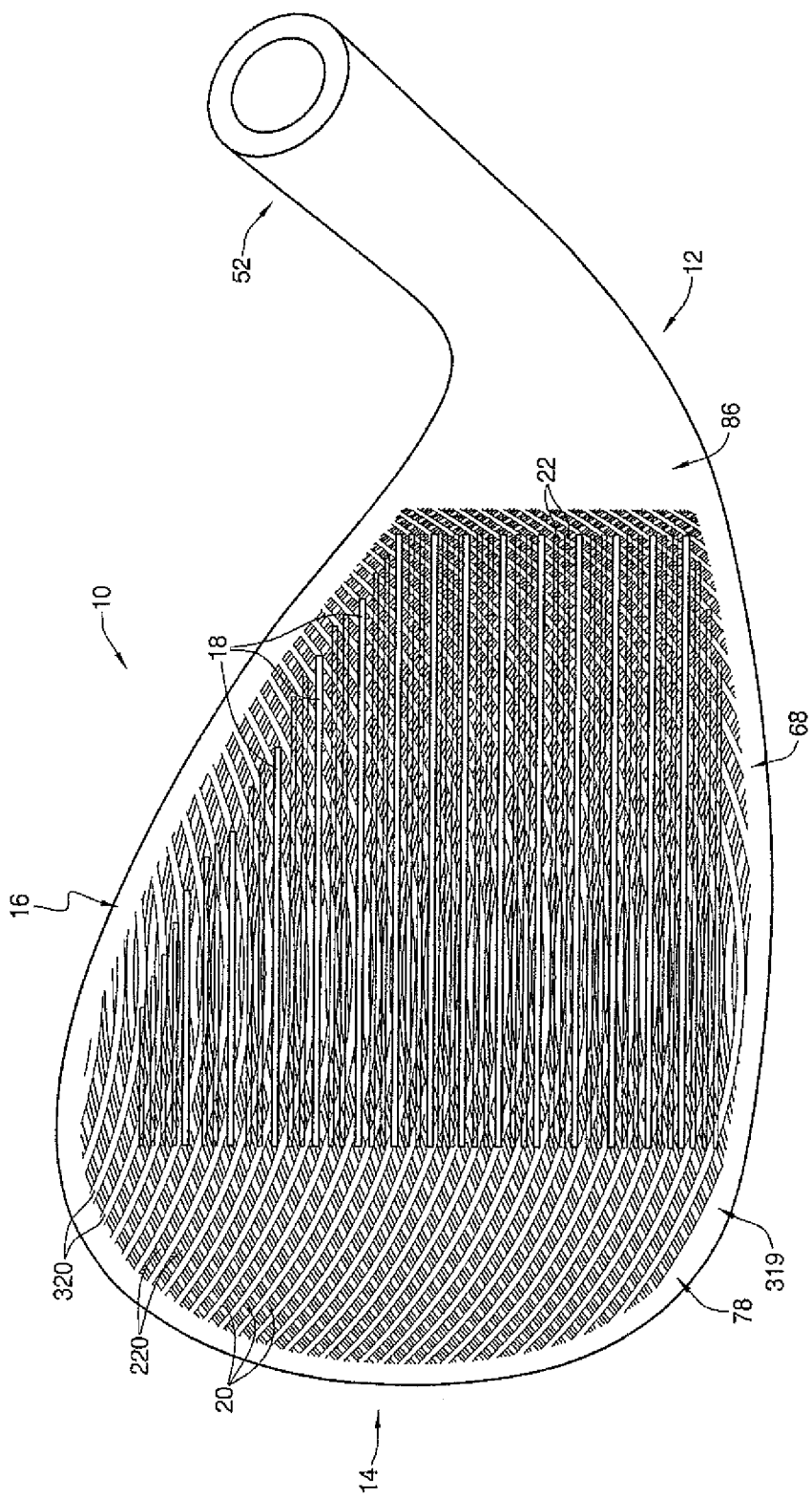
FIG. 15D is a front view of a completed embodiment of a golf club head.

With specific reference to FIGS. 15B and 15C, the third micro-grooves 320 intersect the first and second micro-grooves 20, 220. The cross sectional view that is depicted in FIG. 15C is taken at a location (line 15C-15C of FIG. 15B) at which the third micro-grooves 320 intersect and are perfectly aligned with the second micro-grooves 220. As can be seen by close review of FIG. 15B, however, such is not always the case along the striking surface.

In the embodiment illustrated in FIGS. 15-15B, the spacing between adjacent third micro-grooves 320 is the same as the spacing between second micro-grooves 220. Similarly, due to their arcuate nature, each of the first and second micro-grooves 20, 220 has an apex defined as the highest point of the particular micro-groove along the striking face 16, and each of the third micro-grooves 320 has an apex defined as the lowest point of the particular micro-groove along the striking face 16. In the illustrated embodiment, the apexes of the second and third micro-grooves 220, 320 are not aligned, and instead are spaced apart from one another so as not to intersect one another. In other embodiments, apexes of the second and third micro-grooves 220, 320 can be aligned with one another. In still further embodiments such apexes can partially overlap one another but not be fully aligned.

Preferably, each of the depth, width, and spacing of the second micro-grooves 220 is greater than the depth, width and spacing of the first micro-grooves 20, and each of the depth, width and spacing of the third micro-grooves 320 is no less than the depth, width and spacing of the second micro-grooves 220. In the illustrated embodiment the second and third micro-grooves 220, 320 have the same depth, width and spacing, maintaining the same milling depth, and feed rate as was used to form the second micro-grooves 220. In the illustrated embodiment each of the first, second and third micro-grooves 20, 220, 320 also have substantially the same radius of curvature. In other embodiments the third micro-grooves are greater than the second micro-grooves in one or more of the depth, width and/or spacing. Additionally, the third micro-grooves can be formed using a different milling bit than is used to form either of the first and second micro-grooves, and thus may have a different profile.

In further embodiments, the third micro-groove pattern may have a shape strikingly different than either the first or second micro-groove pattern. For example, the third micro-grooves may have centers of curvature that are offset more or less than 180° relative to the centers of curvature of the first and/or second micro-grooves. As such, the third micro-grooves may be concave or convex relative to a plane other than the virtual ground plane. Also, the third micro-grooves may have radii of curvature that are substantially different from the radii of curvature of the first and/or second micro-grooves.

In yet other embodiments the first, second and/or third micro-grooves may be formed by procedures other than milling, such as, for example, stamping. Also, it is to be understood that other embodiments of the first textured surface pattern may have more than three micro-groove patterns, such as having four, five or more micro-groove patterns. In such embodiments, all, some, or none of the micro-groove patterns may share one or more characteristics such as concavity/convexity, radius of curvature, depth, width, spacing, profile radius or the like.

In still another embodiment of the first textured surface pattern, only the second and third micro-groove patterns as discussed herein are formed on the striking face 16, and not the first micro-groove pattern. In one such embodiment, then, the overlaid second and third micro-groove patterns are 180° opposite to one another.

Yet further, as with embodiments discussed above, the first textured surface pattern, regardless of whether it is made up of two, three or more micro-groove patterns, can cover at least the central region 68 of the striking face, and preferably extends at least partly into the toe region 78. More preferably, the first textured surface pattern extends at least partly into both the toe region 78 and the heel region 86. Preferably, the first textured pattern extends toward the toe portion past the uppermost point 82 of the club head 10 (see FIG. 2). In some embodiments, the first textured pattern covers the majority, and in some cases the entirety, of the toe region 78 of the striking face 16. Alternatively, or in addition, the first textured surface pattern can cover the entirety of the striking face 16 of the club head 10. Further, in some embodiments the first textured surface pattern may cover the central region 68 of the striking face, but not extend substantially into the toe region 78 (similar to the embodiment illustrated in FIG. 14). In other embodiments the extent of the first textured surface pattern may be limited to, for example, the central region 68, and not extend substantially into one or both of the heel region 68 and toe region 78.

As noted previously, the dimensions of the first and second micro-grooves 20, 220 and the spacing between them will have a significant effect on the value of $R_a$ of the striking face. Thus, these dimensional parameters must be selected so that the maximum permitted value of $R_a$ noted above is not exceeded. However, because of normal surface variation and machine tolerances, a sample pool of club heads having micro-grooves intended to effect a specific target surface roughness $R_a$ value may likely effect surface roughness $R_a$ values dispersed about a range. Consequently, as a practical matter, the first textured surface pattern is preferably selected to produce an average value of $R_a$ close to, but still somewhat less than, the desired optimal value of $R_a$. Likewise, the first textured surface pattern also produces a first value of $R_t$, (which may be termed "$R_{t1}$"), that may advantageously be somewhat less than, the desired optimum value of $R_t$.

In some embodiments, an additional sandblasting operation is carried out in step 122. It may be advantageous to treat the striking face by conventional sandblasting, preferably immediately after the mechanical milling steps (steps 108 and 110, and optionally 130 and/or 140). Sandblasting may be performed for a variety of reasons, such as providing a particular aesthetic appearance, and deburring and cleaning the striking face after the milling step is performed. There are data indicating that sandblasting may increase the value of $R_t$, thus requiring a corresponding adjustment of parameters used in the laser etching step to assure that the maximum permitted value of this parameter is not exceeded. After such sandblasting, these roughness values were increased by about 0.00013 mm to 0.00026 mm (5 to 10 μin.), preferably to about 0.0033 mm (130 μin.) ($R_a$) and about 0.018 mm (725 μin.) ($R_t$). Subsequent polishing may be carried out to more sharply define the edges of the region of the striking face 16 occupied by the arcuate micro-grooves 20. In some embodiments, as shown, this first texture region is cut off sharply, forming a vertical boundary, proximate the heel portion 12 of the club head 10.

Figure 10:
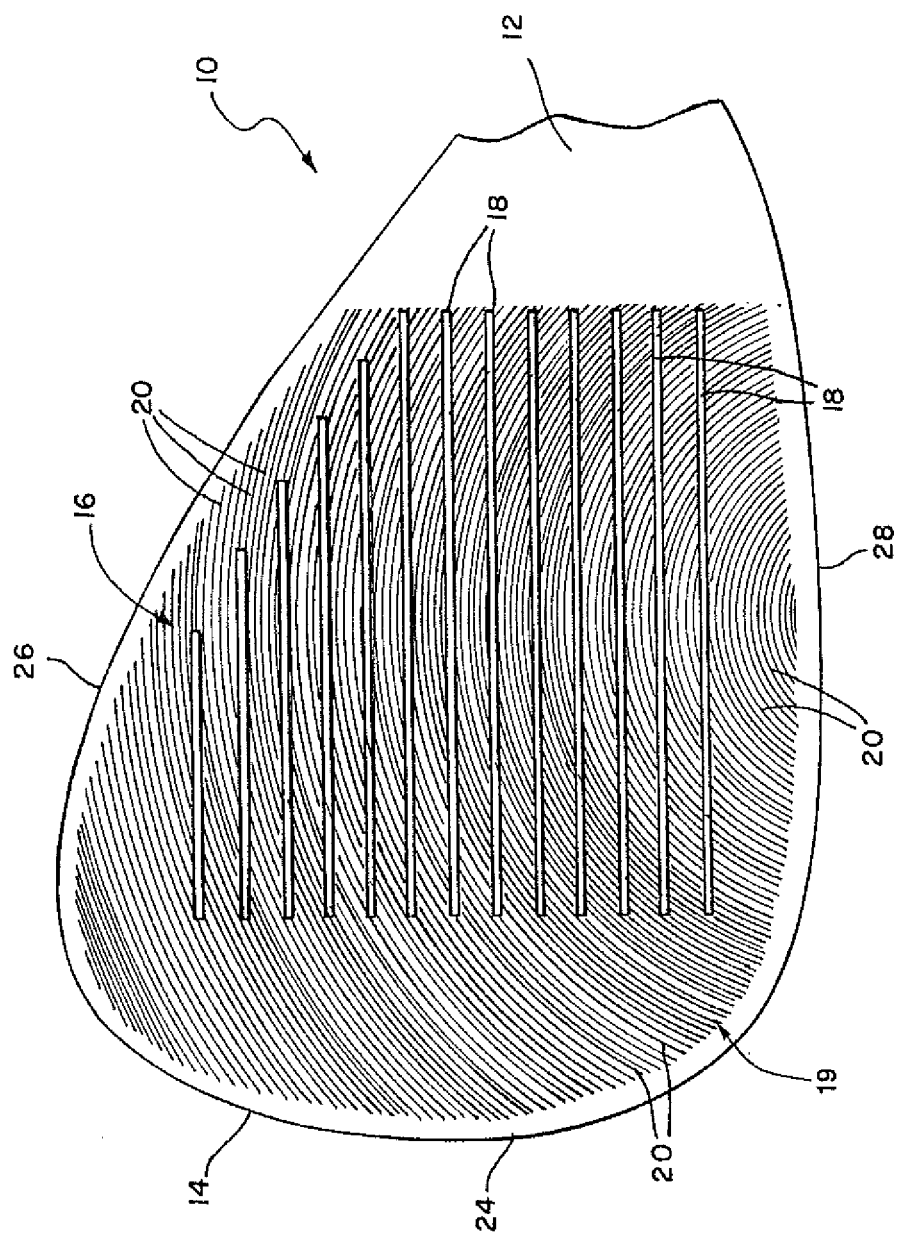

Next, the score lines 18 are formed on the striking face 16, forming an intermediate club head body configuration as shown in FIG. 10. In alternative embodiments, the score lines 18 are integrally cast into the main body as a whole. In other embodiments, the score lines 18 are stamped. However, preferably, the score lines 18 are formed by milling, optionally spin-milling. This method is advantageous in its precision. Preferably, the formation of the score lines 18 occurs subsequent to the formation of the milled first texture pattern 19, 219, 319. In this manner, greater consistency in roughness may be achieved as the milling bit described above may be applied with even pressure throughout. Further, the score lines 18 may be formed with greater precision and more sharply-defined edges.

In some embodiments, after the score lines 18 are formed, the club head 10, or just the striking face 16, may optionally be plated or coated with a metallic layer, or treated chemically or thermally. Such treatments are well-known, and may enhance the aesthetic qualities of the club, and/or one or more utilitarian aspects of the club (such as durability or rust-resistance). For example, in some embodiments, in step 114, the club head 10 is nickel-plated and optionally subsequently chrome-plated in step 116. Such plating enhances the rust-resistance characteristics of the club head. Further, such plating improves the aesthetic quality of the club head 10, and it may serve as a substrate for any future laser etching process. Plating selection is also believed to have an effect on the visual and/or textural characteristics of subsequently-formed laser-etched regions superimposed thereon. Optionally, subsequent to the nickel- and chrome-plating steps 114 and 116, the striking face undergoes a physical vapor deposition ("PVD" herein) process. Preferably, the PVD operation results in a layer that comprises either a pure metal or a metal/non-metal compound. Preferably, the PVD-formed layer comprises a metal comprising at least one of: vanadium, chromium, zirconium, titanium, niobium, molybdenum, hafnium, tantalum, and tungsten. More preferably, the PVD-applied layer is characterized as a nitride, a carbide, an oxide, or a carbonitride. For example, a layer of any of zirconium nitride, chromium nitride, and titanium carbide may be applied, depending on the desired visual effect (e.g. color) and/or material properties. Preferably, the PVD operation results in a layer of titanium carbide. This process enhances the aesthetic quality of the club head 10, while also increasing the durability of the striking face 16.

Figures 11, 12:
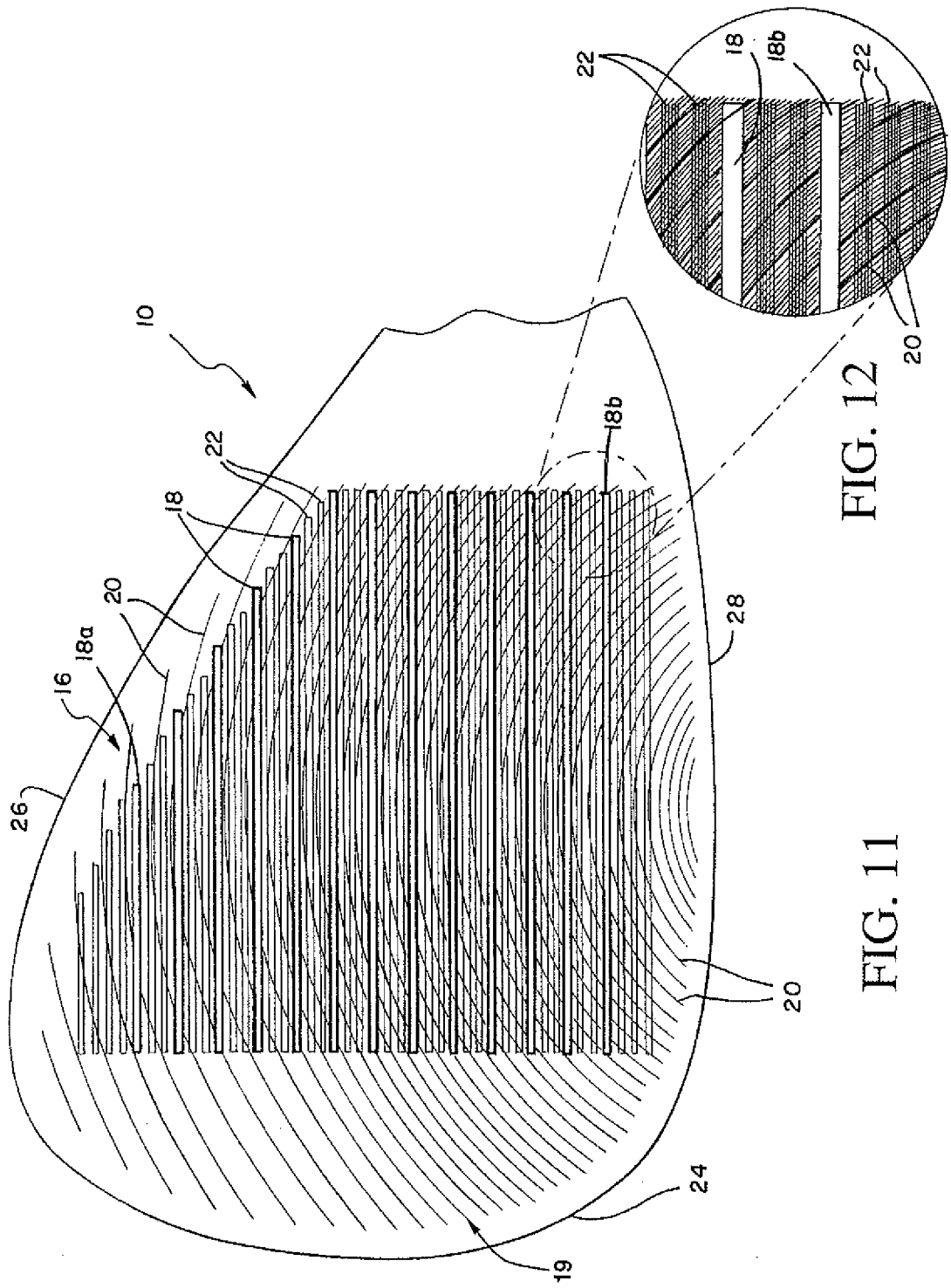
FIG. 12 is detail view of a portion of the front view of FIG. 11.

Next, a laser etching operation 120 is carried out, thus forming the textured surface treatment regions 22. For example, FIGS. 1, 11, and 12 show an embodiment of the striking face 16 after the textured surface treatment regions 22 have been formed. As shown, the textured surface treatment regions 22 create the second textured surface pattern, superimposed on the first textured surface pattern 19. For the sake of convenience this discussion is in the context of the embodiment of the first textured surface pattern 19 as illustrated in FIGS. 1-12. It is to be understood, however, that the principles discussed herein will apply to other embodiments, such as the embodiments of the first textured surface pattern 219, 319 as illustrated in FIGS. 13-15D. In fact, FIG. 15D depicts a completed golf club having textured surface treatment regions 22 in addition to micro-grooves 20, 220, 320 and score lines 18.

In the illustrated exemplary embodiment, two or more substantially parallel textured surface treatment regions 22 are formed between each adjacent pair of score lines 18, and several more textured surface treatment regions 22 are advantageously formed both above an uppermost score line 18a and below a lowermost score line 18b (see FIGS. 11 and 12). The textured surface treatment regions 22 advantageously occupy at least approximately the portion of the striking face 16 that is occupied by the grid of score lines 18, i.e., the central region 68. Advantageously, the textured surface treatment regions 22 may extend farther toward the heel portion 12 than some or all of the score lines 18. The laser etching operation 120 is preferably carried out after the score line forming process 112 in part such that the score lines 18 provide a basis for properly and efficiently aligning the feed direction of the laser.

After laser etching, the value of $R_a$ may not be appreciably increased, but other benefits are suggested by empirical data of the combined effect of the laser-etched regions and the mechanically milled regions. For example, this combination appears to provide a low-cost resultant texture that bears a narrower margin of error of roughness over a sample set as compared with mechanical milling alone. Because of a smaller tolerance window, the target $R_a$ can, be raised closer to the maximum under USGA regulations. Preferably, the final striking face surface roughness ($R_a$) is within the range of 0.0030 mm (120 μin.) and 0.0047 mm (185 μin.). Also, the value of $R_t$ was increased to as much as about 0.024 mm (950 μin.), thus providing for consistently approaching the maximum $R_t$ limit set by the USGA.

In the exemplary embodiment, each of the textured surface treatment regions 22 is formed as a series of etched lines by a pulsed laser, preferably with a wavelength within the range of about 900 nm to about 1200 nm, more preferably within the range of about 1000 nm to about 1100 nm, and most preferably equal to about 1064 nm. Each of the etched lines is preferably formed by a first pass of the laser head in a first direction, and a second pass in the opposite direction. The power, pulse rate, and linear speed of the laser head will depend on the particular surface treatment of the striking face. For example, if the striking face 16 is subjected to physical vapor deposition (PVD) (e.g. in step 118), the first pass may be performed at a pulse rate of 20 KHz, a power of about 4.2 KW, and a linear speed of 800 mm/sec, while the second pass may be performed at a pulse rate of 10 KHz, a power of about 3.5 KW, and a linear speed of 180 mm/sec. For a chrome-plated striking face, the first pass may be performed at a pulse rate of 10 KHz, a power of about 3.5 KW, and a linear speed of 180 mm/sec, while the second pass may be performed at a pulse rate of 20 KHz, a power of about 4.2 KW, and a linear speed of 800 mm/sec. Using these laser settings, a value of $R_t$ very close to 0.025 mm (1000 μin.) can be achieved (e.g., about 950 μin. or 0.024 mm) with the etched lines having the following physical parameters (and assuming a milled texture in accordance with the design parameters described above):

| | |
|---|---|
| Width of the laser-etched region created by each pass: | 0.11 mm |
| Total laser-etched region width: | 0.36 mm |
| Distance between adjacent laser-etched regions: | 0.67 mm |

It will be understood that lasers with different operational parameters (e.g., wavelength, power, pulse rate, and/or linear head speed) from those described above in the exemplary embodiment may be used to achieve values of $R_t$ that are close to, but that do not exceed, the above-noted maximum permitted value. Also, the distance between adjacent laser-etched regions corresponds to the distance S of FIG. 5A.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A golf club head comprising;
a heel portion;
a toe portion opposite the heel portion; and
a striking face, the striking face including:
a plurality of score lines each having an average depth no less than about 0.10 mm;
a first micro-groove pattern comprising a plurality of first micro-grooves, each of the first micro-grooves having a first average depth no greater than about 0.025 mm and a first average width, the first micro-grooves being substantially parallel to one another; and
a second micro-groove pattern comprising a plurality of second micro-grooves, each of the second micro-grooves having a second average depth no greater than about 0.025 mm and a second average width different than the first average width, the second micro-groves being substantially parallel to one another, wherein the second micro-groove pattern is overlaid onto the first micro-groove pattern.

2. A golf club head as in claim 1, wherein the second average width is greater than the first average width.

3. A golf club head as in claim 1, wherein the second micro-grooves are parallel to the first micro-grooves.

4. A golf club head as in claim 1, wherein, when the golf club head is oriented in a reference position, the first micro-grooves and the second micro-grooves form upwardly convex paths.

5. A golf club head as in claim 1, wherein the second micro-grooves are spaced from each other by a distance no less than about 0.2 in.

6. A golf club head as in claim 1, wherein the striking face further comprises a plurality of heat-treated regions.

7. A golf club head as in claim 6, wherein the plurality of heat-treated regions comprises laser-etched regions.

8. A golf club head as in claim 6, wherein each of the heat-treated regions extends along a generally linear path.

9. A golf club head as in claim 1, wherein the striking face has a surface roughness Ra within a range of about 0.0030 mm (120 μin) and about 0.0047 mm (185 μin).

10. A golf club head as in claim 1, wherein the club head has a loft angle of at least 18°.

11. A golf club head comprising:
a heel portion;
a toe portion opposite the heel portion; and
a striking face, the striking face including:
a plurality of score lines each having an average depth no less than about 0.10 mm;
a first micro-groove pattern comprising a plurality of first micro-grooves, each of the first micro-grooves having a first cross-sectional profile defining a first average depth no greater than about 0.025 mm and a first average width, the first micro-grooves being substantially parallel to one another; and
a second micro-groove pattern comprising a plurality of second micro-grooves, each of the second micro-grooves having a second cross-sectional profile defining a second average depth no greater than about 0.025 mm and a second average width, the second micro-grooves being substantially parallel to one another, wherein the second micro-groove pattern is overlaid onto the first micro-groove pattern; and
wherein the first cross-sectional profile is different from the second cross-sectional profile.

12. A golf club head as in claim 11, wherein the striking face has a surface roughness Ra within a range of about 0.0030 mm (120 μin) and about 0.0047 mm (185 μin).

13. A golf club head as in claim 12, wherein the plurality of heat-treated regions comprises laser-etched regions.

14. A golf club head as in claim 13, wherein each of the heat-treated regions extends along a generally linear path.

15. A golf club head as in claim 11, wherein the striking face further comprises a plurality of heat-treated regions.

16. A golf club head as in claim 11, wherein the club head has a loft angle of at least 18°.

17. A method comprising:

forming a first textured surface pattern in a striking face of a golf club head main body, the first textured surface pattern imparting a surface roughness value to the striking face, wherein forming the first texture surface pattern comprises:

forming a first micro-groove pattern comprising a plurality of first micro-grooves that are substantially parallel to one another, each of the first micro-grooves having a first cross-sectional profile that defines a first average depth and a first average width; and forming, by superimposing onto the first micro-groove pattern, a second micro-groove pattern comprising a plurality of second micro-grooves that are substantially parallel to one another, each of the second micro-grooves having a second cross-sectional profile that defines a second average depth and a second average width, wherein the first cross-sectional profile is different from the second cross-sectional profile.

18. A method as in claim 17, wherein forming the first micro-groove pattern comprises mechanically milling the first micro-grooves using a first milling bit set at a first milling depth, and milling at a first feed rate.

19. A method as in claim 18, wherein forming the second micro-groove pattern comprises mechanically milling the second micro-grooves using a second milling bit set at a second milling depth, and milling at a second feed rate, wherein the second milling depth is deeper than the first milling depth and the second feed rate is greater than the first feed rate.

20. A method as in claim 17, further comprising forming a second textured surface pattern, superimposed on the first textured surface pattern, by laser etching the second textured surface pattern.

* * * * *